(12) United States Patent
Laine et al.

(10) Patent No.: US 11,494,879 B2
(45) Date of Patent: Nov. 8, 2022

(54) CONVOLUTIONAL BLIND-SPOT ARCHITECTURES AND BAYESIAN IMAGE RESTORATION

(71) Applicant: NVIDIA Corporation, Santa Clara, CA (US)

(72) Inventors: Samuli Matias Laine, Vantaa (FI); Tero Tapani Karras, Helsinki (FI); Jaakko T. Lehtinen, Helsinki (FI); Timo Oskari Aila, Tuusula (FI)

(73) Assignee: NVIDIA Corporation, Santa Clara, CA (US)

(*) Notice: Subject to any disclaimer, the term of this patent is extended or adjusted under 35 U.S.C. 154(b) by 403 days.

(21) Appl. No.: 16/723,375

(22) Filed: Dec. 20, 2019

(65) Prior Publication Data
US 2020/0242739 A1    Jul. 30, 2020

Related U.S. Application Data

(60) Provisional application No. 62/854,593, filed on May 30, 2019, provisional application No. 62/796,525, filed on Jan. 24, 2019.

(51) Int. Cl.
| | |
|---|---|
| *G06K 9/00* | (2022.01) |
| *G06T 5/00* | (2006.01) |
| *G06N 3/04* | (2006.01) |
| *G06F 9/54* | (2006.01) |
| *G06N 3/08* | (2006.01) |

(52) U.S. Cl.
CPC ............ *G06T 5/002* (2013.01); *G06F 9/545* (2013.01); *G06N 3/0418* (2013.01); *G06N 3/08* (2013.01); *G06T 2207/20182* (2013.01)

(58) Field of Classification Search
CPC .......... G06T 5/002; G06T 2207/20182; G06F 9/545; G06N 3/0418; G06N 3/08
USPC ......................................................... 382/154
See application file for complete search history.

(56) References Cited

PUBLICATIONS

Tai, Ying, et al. "Memnet: A persistent memory network for image restoration." Proceedings of the IEEE international conference on computer vision. 2017. (Year: 2017).*

(Continued)

*Primary Examiner* — Jonathan S Lee
(74) *Attorney, Agent, or Firm* — Leydig, Voit & Mayer, Ltd.

(57) ABSTRACT

A neural network architecture is disclosed for restoring noisy data. The neural network is a blind-spot network that can be trained according to a self-supervised framework. In an embodiment, the blind-spot network includes a plurality of network branches. Each network branch processes a version of the input data using one or more layers associated with kernels that have a receptive field that extends in a particular half-plane relative to the output value. In one embodiment, the versions of the input data are offset in a particular direction and the convolution kernels are rotated to correspond to the particular direction of the associated network branch. In another embodiment, the versions of the input data are rotated and the convolution kernel is the same for each network branch. The outputs of the network branches are composited to de-noise the image. In some embodiments, Bayesian filtering is performed to de-noise the input data.

17 Claims, 20 Drawing Sheets

(56) References Cited

PUBLICATIONS

Athiwartkun, B., et al., "There are many consistent explanations of unlabeled data: Why you should average," In Proc. International Conference on Learning Representations (ICLR), 2019.

Batson, J., et al., "Noise2self: Blind denoising by self-supervision," CoRR, abs/1901.11365, 2019.

Brock, A., et al., "Large scale GAN training for high fidelity natural image synthesis," In Proc. International Conference on Learning Representations (ICLR) 2019.

He, K., et al., "Delving deep into rectifiers: Surpassing human-level performance on imagenet classification," CoRR, abs/1502.01852, 2015.

Karras, T., et al., "Progressive growing on GANsj for improved quality, stability, and variation," Proc. International Conference on Learning Representations (ICLR), 2018.

Kingma, D.P., et al., "Adam: A method for stochastic optimization," in Proc. International Conference on Learning Representations (ICLR), 2015.

Krull, A., et al., "Noise2Void—Learning denoising from single noisy images," CoRR, abs/1811.10980, 2018.

Lehtinen, J., et al., "Noise2Noise: Learning image restoration without clean data," in Proc. International Conference on Machine Learning (ICML), 2018.

Maas, A.L., et al., "Rectifier nonlinearities improve neural network acoustic models," in Proc. International Conference on Machine Learning (ICML), 2013.

Ronneberger, O., et al., "U-Net: Convolutional networks for biomedical image segmentation," Medical Image Consulting and Computer-Assisted Intervention (MICCAI), 9351:234-241, 2015.

Tarvainen, A., et al., "Mean teachers are better role models: Weight-averaged consistency targets improve semi-supervised deep learning results," in Proc. Advances in Neural Information Processing Systems 30 (NIPS), pp. 1195-1204, 2017.

Bromiley, P.A., "Products and convolutions of Gaussian probability density functions," Technical Report 2003-003, www.tina-vision.net, 2003.

He, K., et al., "Deep residual learning for image recognition," 2016 IEEE Conference on Computer Vision and Pattern Recognition (CVPR), pp. 770-778, 2016.

Huang, Gao, et al., "Densely connected convolutional networks," In Proceedings of the IEEE Conference on Computer Vision and Pattern Recognition, 2017.

Kendall, Alex, et al., "What uncertainties do we need in Bayesian deep learning for computer vision?" In Advances in Neural Information Processing Systems 30, pp. 5574-5584, 2017.

Van Den Oors, Aaron, et al., "Conditional image general with PixelCNN decoders," In Advances in Neural Information Processing Systems 29, pp. 4790-4798, 2016.

\* cited by examiner

CONVOLUTIONAL BLIND-SPOT ARCHITECTURES AND BAYESIAN IMAGE RESTORATION

CROSS-REFERENCE TO RELATED APPLICATIONS

This application claims the benefit of U.S. Provisional Application No. 62/796,525 titled "Convolutional Noise2Void Architectures and Bayesian Image Restoration", filed Jan. 24, 2019, the entire contents of which is incorporated herein by reference. This application also claims the benefit of U.S. Provisional Application No. 62/854,593 titled "Convolutional Noise2Void Architectures and Bayesian Image Restoration", filed May 30, 2019, the entire contents of which is incorporated herein by reference.

TECHNICAL FIELD

The present disclosure relates to image processing. More specifically, the present disclosure relates to techniques for performing Bayesian image restoration using a neural network.

BACKGROUND

Traditional neural networks implemented using fully supervised training require a set of training data comprising pairs of input data and corresponding target data. For example, in an image processing problem, the training data can include pairs of corrupted images and corresponding clean images. Newer neural network training frameworks have removed the need for clean data (e.g., uncorrupted image data) from the training data set. Instead, these frameworks can utilize pairs of images that have different realizations of the same stochastic corruption (e.g., "Noise2Noise" frameworks) or even individual corrupted images without any realization of the corresponding clean data (e.g., self-supervised or "Noise2Void" frameworks). Image restoration methods that do not require clean, uncorrupted data in the training data set are valuable whenever clean data or pairs of corrupted data is difficult, dangerous, expensive, or impossible to obtain, such as in astronomical or medical imaging.

However, self-supervised neural network frameworks can be utilized to implement a de-noiser where the training data set consists of independent images where noise or corruption is known to be independent between pixels. Examples of independent noise include white noise or per-pixel Poisson noise. One method of implementing a self-supervised framework utilizes a blind-spot network, where the receptive field of an output pixel (i.e., the region of input pixels that the neural network considers when determining a color of the output pixel) does not include a corresponding pixel in the noisy input. In other words, the value of the output pixel does not depend on the value of the corresponding input pixel. In such cases, the color of the corresponding input pixel can be utilized as the target color for the output pixel during training, assuming that the corresponding statistical independence constraints are met.

Nevertheless, a blind spot network can be difficult to implement, in practice, as multiple layers within the neural network tend to have information from pixels flow into neighboring pixels. Previous attempts to create blind-spot networks have relied on masking pixel values in the input by copying values from proximate pixels into a center pixel associated with a convolution kernel. However, as the complexity of the neural network increases, the number of pixels that can be effectively masked decreases, which can significantly reduce the effectiveness of a single training step. Furthermore, ignoring the value of the center pixel can be highly detrimental to the quality of the resulting de-noised image. Therefore, there is a need for addressing these issues and/or other issues associated with the prior art.

SUMMARY

A method, computer readable medium, and system are disclosed for performing Bayesian image restoration using a blind-spot neural network architecture. In some embodiments, the blind-spot neural network architecture is designed to include multiple network branches that extend the receptive field in different directions over the image, where each network branch of the blind-spot neural network is associated with a corresponding receptive field that includes information from pixels proximate a central input pixel without including information from the central input pixel. A composition layer combines the information from the multiple network branches to construct a composite feature volume having, for each output pixel, a receptive field that does not include information from the central input pixel, without requiring the information from the central input pixel to be masked out.

In some embodiments, each network branch can be functionally identical except that the convolution kernel is rotated around the central input pixel by a particular amount. For example, the multiple network branches can each include a convolution kernel that shares a single set of convolution coefficients rotated around the central pixel of the convolution kernel. In other embodiments, each network branch can be functionally different utilizing different convolution kernels for each network branch.

In some embodiments, the convolution kernel includes coefficients on a first side of a line of pixels that includes the central input pixel of the convolution kernel and zero-valued coefficients on a second side of the line of pixels. In other embodiments, the convolution kernel can be reduced in size and offset from the central input pixel to obtain a similar result without zeroing out a set of coefficients on the second side of the line of pixels. In yet other embodiments, the convolution kernel can include an L-shaped kernel where a coefficient corresponding to the central input pixel is zero.

In an embodiment, a method is disclosed for restoring noisy data utilizing a blind-spot neural network. The method includes the steps of receiving noisy input data, processing the noisy input data by a plurality of network branches in the blind-spot neural network, compositing outputs from the plurality of network branches to generate a composite feature volume, and generating restored data based on the composite feature volume. In another embodiment, a method is disclosed wherein the composite feature volume comprises distribution parameters and the restored data is generated by filtering the noisy input data based on the distribution parameters.

In some embodiments, the blind-spot neural network architecture can be adapted to other types of noisy input data such as noisy audio data or noisy video data. The noisy data can be restored using a blind-spot neural network with a plurality of network branches. For example, audio data can restore noisy audio samples by processing a plurality of audio samples by two network branches, where the receptive field of the first network branch extends forward in time relative to a particular audio sample and the receptive field of the second network branch extends backward in time relative to the particular audio sample. Video data can be processed as individual image frames in a sequence of image frames, or as a three-dimensional volume where the receptive field for a particular network branch is restricted in one or more dimensions.

In another embodiment, a system is disclosed for implementing a convolutional architecture for restoring noisy data. The system includes a memory storing noisy input data and at least one processor configured to process the noisy input data via a blind-spot neural network. The blind-spot neural network includes a plurality of network branches configured to process versions of the noisy input data to generate features associated with a receptive field having a particular orientation and a composition layer configured to composite outputs from the plurality of network branches to generate a composite feature volume. The at least one processor is further configured to generate restored data based on the composite feature volume.

In yet another embodiment, a non-transitory computer readable medium is disclosed that stores instructions that, when executed by at least one processor, cause the at least one processor to perform steps for restoring noisy data. The steps include receiving noisy input data, processing the noisy input data by a plurality of network branches in the blind-spot neural network, compositing outputs from the plurality of network branches to generate a composite feature volume, and generating restored data based on the composite feature volume.

BRIEF DESCRIPTION OF THE DRAWINGS

FIGS. 9A-9C is a conceptual illustration of the spread of information, spatially, due to down-sampling and up-sampling operations, in accordance with some embodiments.

FIGS. 10A-10D illustrate modified up-sampling and down-sampling operations, in accordance with some embodiments.

FIGS. 11A-11D illustrate modified up-sampling and down-sampling operations, in accordance with some embodiments.

DETAILED DESCRIPTION

A neural network can be configured as a blind-spot neural network and trained in accordance with a self-supervised framework. The neural network parameters may be trained using a loss function (L2 loss, L1 loss, negative log-likelihood loss, or the like) that compares the output of the network with the value of the noisy input pixel. Because the value of the noisy input pixel is excluded from the receptive field of the predicted pixel, the loss function can be used to successfully train the neural network using the same noisy image as both input and target.

In an embodiment, the blind-spot neural network implements a plurality of network branches, with each network branch processing a version of the noisy input image that is offset in a particular direction. Each network branch implements one or more layers having a receptive field in a half-plane extending in a particular direction relative to an output pixel and having a particular orientation that is rotated relative to receptive fields of the other network branches.

In another embodiment, the blind-spot neural network implements a plurality of network branches, with each network branch processing a version of the noisy input image that is rotated to a particular orientation. Each network branch implements one or more layers having a receptive field in a half-plane extending in the same direction relative to an output pixel.

In some embodiments, the blind-spot neural network can be trained to predict the pixel values for the restored image directly. In other embodiments, the blind-spot neural network can be trained to predict a parametric model that represents a distribution of the clean versions of the pixels. The parametric model can then be used to filter the noisy input image with the predicted distributions, e.g., using Bayes' rule.

Figure 1:
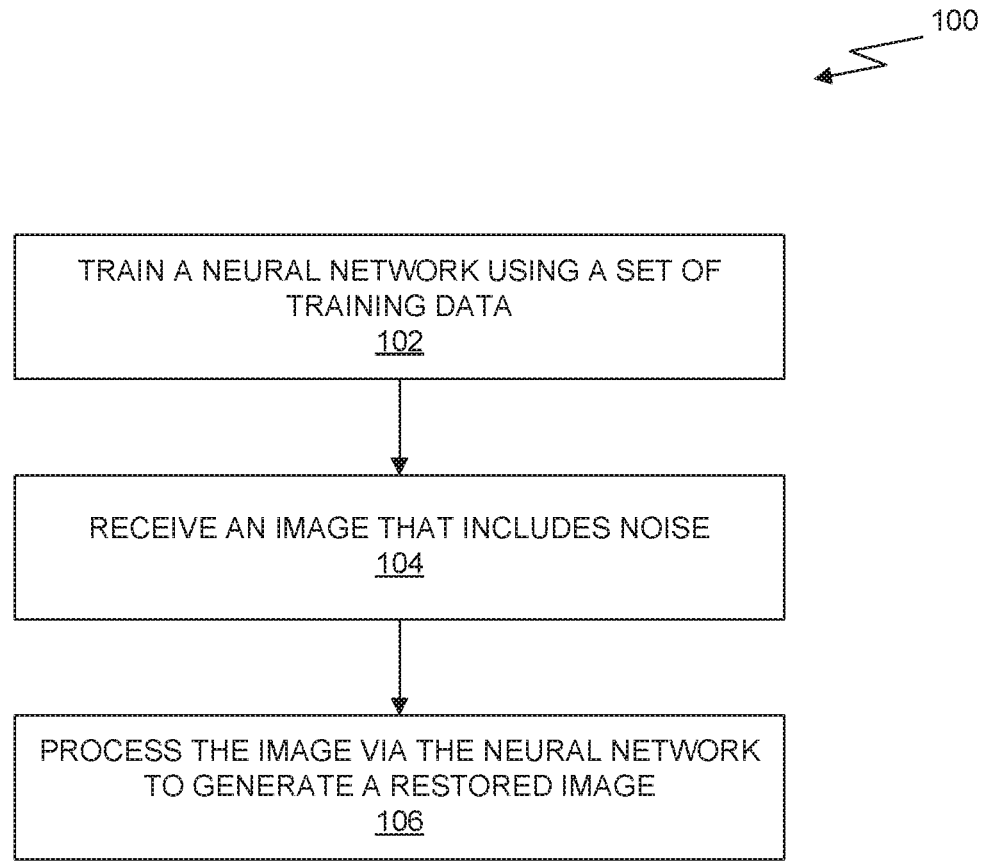
FIG. 1 illustrates a flowchart of a method for restoring an image utilizing a neural network, in accordance with some embodiments.

FIG. 1 illustrates a flowchart of a method 100 for restoring an image utilizing a neural network, in accordance with some embodiments. Although method 100 is described in the context of a processing unit, the method 100 may also be performed by a program (e.g., software), custom circuitry, or by a combination of custom circuitry and a program. For example, the method 100 may be executed by a GPU (graphics processing unit), CPU (central processing unit), or any processor capable of implementing at least a portion of the neural network. Furthermore, persons of ordinary skill in the art will understand that any system that performs method 100 is within the scope and spirit of embodiments of the present disclosure.

At step 102, a neural network is trained using a set of training data. The set of training data can include images with noisy samples, as long as the noise is statistically independent on a pixel-to-pixel basis. In some embodiments, the neural network implements a blind-spot network architecture where a receptive field associated with an output pixel is independent of information in a corresponding pixel of the input image. The neural network can include multiple network branches, each network branch extending a receptive field of an output pixel in a different direction relative to a location of the output pixel.

At step 104, an image is received, where the image includes statistically independent noise. The image can be read from a memory, captured by an image sensor or other type of sensor (e.g., as in the case of magnetic resonant imaging), or generated from a rendering algorithm through some type of graphics processing pipeline.

At step 106, the image is processed via the neural network to generate a restored image. The noisy samples (e.g., pixel values) processed by the neural network generate samples of the restored image with a reduced noise component. In some embodiments, the neural network can include a composition layer that combines the information from the multiple network branches. The neural network can optionally include one or more additional layers after the composition layer that implement operations that do not spread information spatially. For example, the additional layers can include 1×1 convolution layers, activation functions, and the like to reduce the data to the final output sample values in the restored image.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2A:
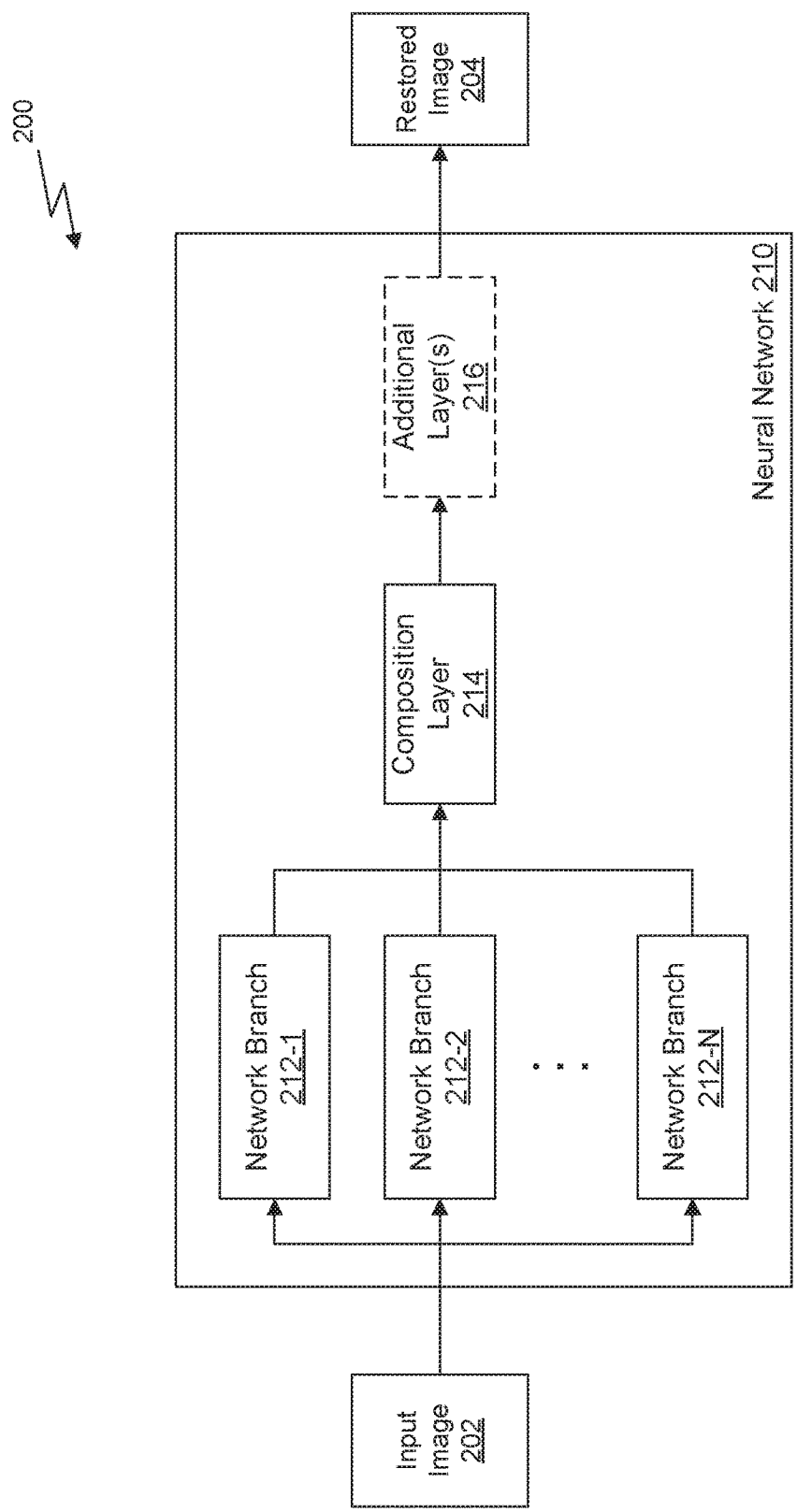
FIG. 2A illustrates an image processing system, in accordance with some embodiments.

FIG. 2A illustrates an image processing system 200, in accordance with some embodiments. The image processing system 200 includes a neural network 210 configured to receive an input image 202 and generate a restored image 204.

In some embodiments, the neural network 210 includes multiple network branches 212. As depicted in FIG. 2A, the neural network 210 includes N network branches 212, labeled 212-1 through 212-N. In some embodiments, the neural network 210 includes four network branches 212, each network branch 212 corresponding to one of four directions associated with a receptive field for the network branch 212. Each network branch 212 can include one or more layers. For example, each network branch 212 can include a convolution layer that applies a corresponding convolution kernel to the samples of the input image 202. Each network branch 212 can include two or more layers connected serially, where one layer operates on the output of a previous layer. For example, two or more convolution operations can be performed in a serial manner as implemented by two separate and distinct layers in the network branch 212. In some embodiments, each network branch 212 may implement a U-net architecture.

The neural network 210 also includes a composition layer 214 that combines the information output by each of the multiple network branches 212. In addition, the neural network 210 can optionally include one or more additional layers 216 configured to implement operations that do not spread information spatially. In some embodiments, the output of the neural network 210 can be referred to as a composite feature volume. In some cases, the composite feature volume can be the restored image 204 because the composite features are the pixel values for one or more color components of the restored image 204.

In some embodiments, the neural network 210 can be implemented, at least in part, on a parallel processing unit. For example, each layer of the neural network 210 can be implemented as a series of instructions executed within a parallel processing unit, where each instruction is applied to different sets of data from the input image 202. In other embodiments, some or all of the neural network 210 can be implemented on a general purpose processor, such as a CPU. In yet other embodiments, some or all of the neural network 210 can be implemented in special purpose hardware. Furthermore, persons of ordinary skill in the art will understand that any system that performs the operations of the image processing system 200 is within the scope and spirit of embodiments of the present disclosure.

In some embodiments, the input image 202 and/or the restored image 204 can be stored in a memory (not explicitly shown in FIG. 2A). The memory can be a volatile memory such as dynamic random access memory (DRAM) or a non-volatile memory such as a hard disk drive (HDD), solid state drive (SSD), network-based storage (e.g., a storage area network), or the like. In some embodiments, the input image 202 can be received via a network or from an auxiliary system connected to the image processing system 200, such as an image sensor, medical imaging apparatus, or the like.

Figure 2B:
FIG. 2B illustrates a convolution kernel associated with a layer of the network branch, in accordance with some embodiments.

FIG. 2B illustrates a convolution kernel 230 associated with a layer of the network branch 212, in accordance with some embodiments. As depicted in FIG. 2B, the convolution kernel 230 is a five pixel by five pixel (5×5) convolution kernel. A first portion of the convolution kernel 230 is populated by non-zero coefficients (labeled 'x'), and a second portion of the convolution kernel 230 is populated by coefficients having a value of zero (labeled '0'). It will be appreciated that referring to the coefficients in the first portion of the convolution kernel as "non-zero coefficients" does not exclude any particular coefficient of having a value of zero, as a learned parameter; however, all coefficients in the second portion of the convolution kernel are forced to have a value of zero. The line demarcating the border between the non-zero coefficients and the zero-value coefficients passes through or borders on a central pixel in the convolution kernel 230.

Figure 2C:
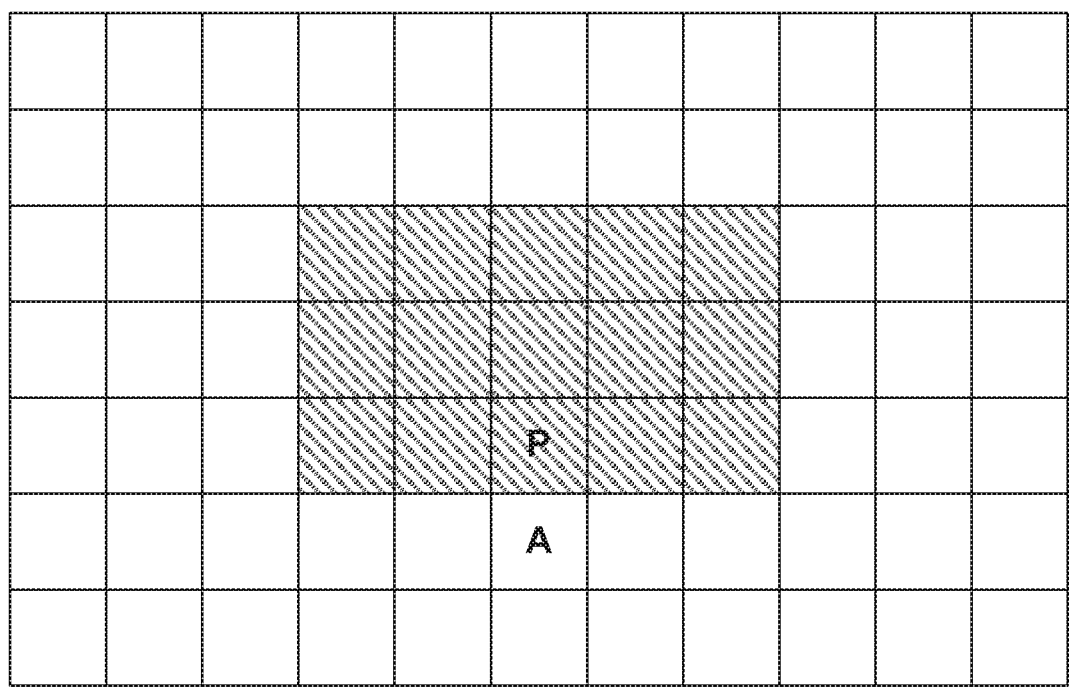
FIG. 2C illustrates a receptive field for pixel P corresponding with a first layer configured to apply the convolution kernel to the input image, in accordance with some embodiments.

FIG. 2C illustrates a receptive field 250 for pixel P corresponding with a first layer configured to apply the convolution kernel 230 to the input image 202, in accordance with some embodiments. The receptive field 250 includes those pixel locations in the input to the first layer that contribute to the value of pixel P in the output of the first layer. The receptive field 250 does not include pixel A, located one pixel below pixel P. It will be appreciated that neural network software and/or hardware can implement a convolution operation so that the convolution kernel 230 is implicitly mirrored for efficiency reasons. In subsequent figures depicting receptive fields of convolution operation(s), we assume that such mirroring takes place.

Figure 2D:
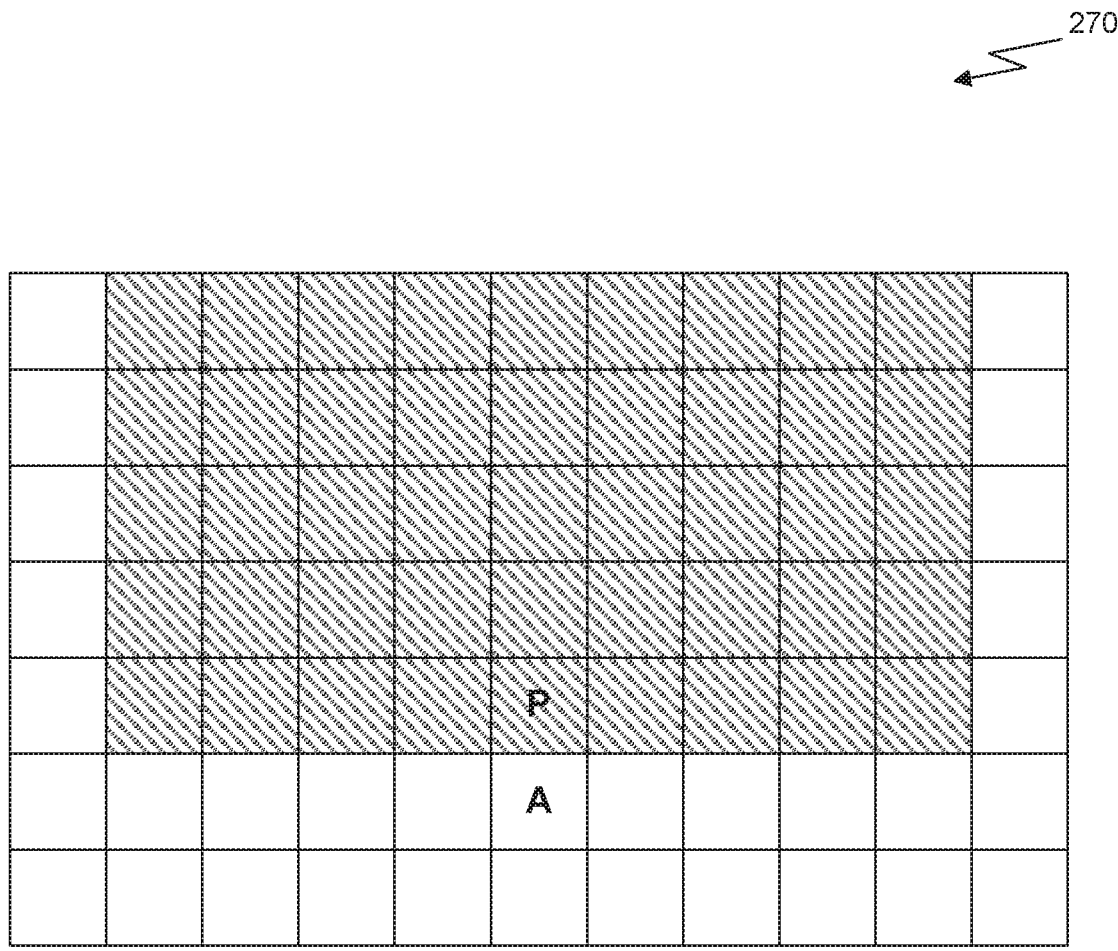
FIG. 2D illustrates the expansion of the receptive field for pixel P as the convolution kernel is applied by a second layer of the neural network subsequent to the first layer, in accordance with some embodiments.

FIG. 2D illustrates the expansion of the receptive field for pixel P as a second convolution kernel of the same shape as the first convolution kernel 230 is applied by a second layer of the neural network subsequent to the first layer, in accordance with some embodiments. It will be appreciated that the coefficients and the shape of the second convolution kernel for the second layer can differ from those of the first convolution kernel 230 for the first layer, although the receptive fields of both convolution kernels are required to have the same orientation.

As depicted in FIG. 2D, the receptive field 270 expands in a particular direction relative to the pixel P. The expansion direction is dependent on the configuration of the zero value coefficients in the convolution kernel 230 and does not exclude expansion in multiple directions. The expansion direction does exclude at least one direction. For example, it will be appreciated that the receptive field 270 does not expand to include pixel A, located one pixel below pixel P. Additional layers of a network branch 212 can be implemented after the first and second layers without expanding the receptive field to include pixel A.

By using combinations of different receptive fields output by different network branches 212, the neural network 210 is realized as a blind spot network. The blind spot network can be implemented on one or more parallel processing units, such as PPU 300, described in more detail below.

It will be appreciated that the concepts illustrated by the neural network 210 can be applied to other types of noisy input data, including one-dimensional data such as audio data. Audio data can be represented as a number of discrete audio samples over a given time, as sampled at a particular sampling frequency. In order to reduce noise from the audio data, a blind-spot neural network 210 can be implemented with two network branches 212-1 and 212-2.

Figure 2E:
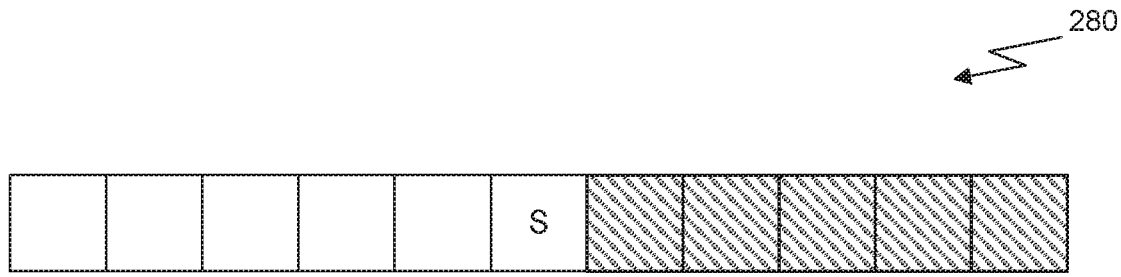
FIG. 2E illustrates a receptive field for an audio sample processed by a first network branch, in accordance with some embodiments.

FIG. 2E illustrates a receptive field 280 for an audio sample S processed by a first network branch 212-1, in accordance with some embodiments. As depicted in FIG. 2E, the first network branch 212-1 expands the receptive field 280 forward in time, relative to a sampling time for audio sample S.

Figure 2F:
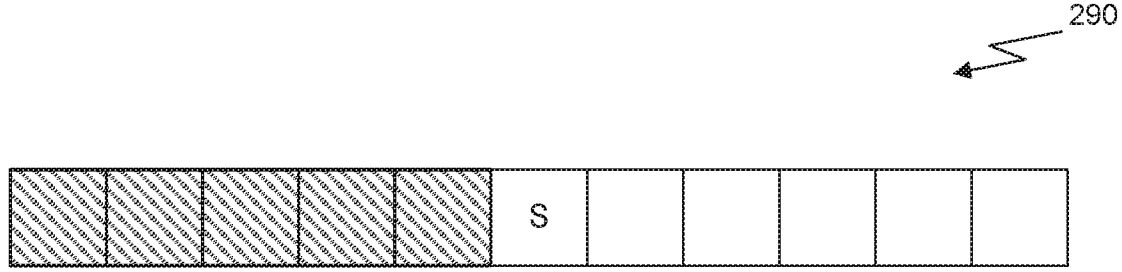
FIG. 2F illustrates a receptive field for an audio sample processed by a second network branch, in accordance with some embodiments.

FIG. 2F illustrates a receptive field 290 for an audio sample processed by a second network branch 212-2, in accordance with some embodiments. As depicted in FIG. 2F, the second network branch 212-2 expands the receptive field 290 backwards in time, relative to a sampling time for audio sample S.

By combining the output of the first network branch 212-1 and the second network branch 212-2 using the composition layer 214, a restored audio sample value for sample S depends on a receptive field that excludes the noisy input value for sample S. Consequently, the blind-spot neural network 210 can be adapted for audio data.

In other embodiments, the blind-spot neural network 210 can be adapted for video data. In some embodiments, single image frames can be extracted (e.g., decoded) from the video data and processed in a similar manner to the noisy image data described above. In other embodiments, the blind-spot neural network can include more than four network branches (e.g., six network branches), where the receptive field for each network branch expands in one direction in one dimension, where dimensions are <x, y> coordinates in pixel space and <t> coordinates in a frame sequence (e.g., time). In some embodiments, the number of network branches can be greater than or less than six, and the receptive field for each network branch can expand in one direction in two or more dimensions simultaneously.

Parallel Processing Architecture

Figure 3:
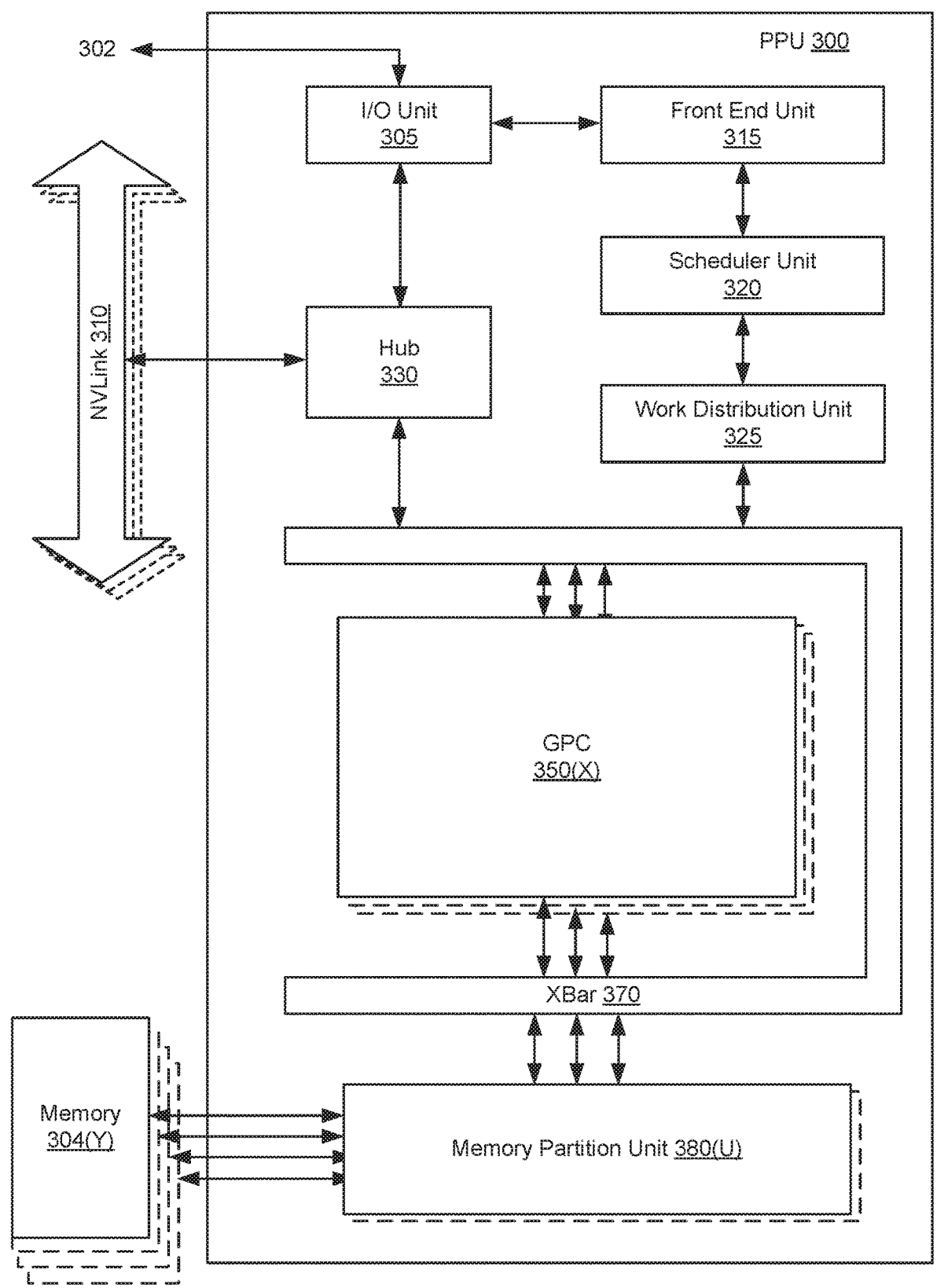
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
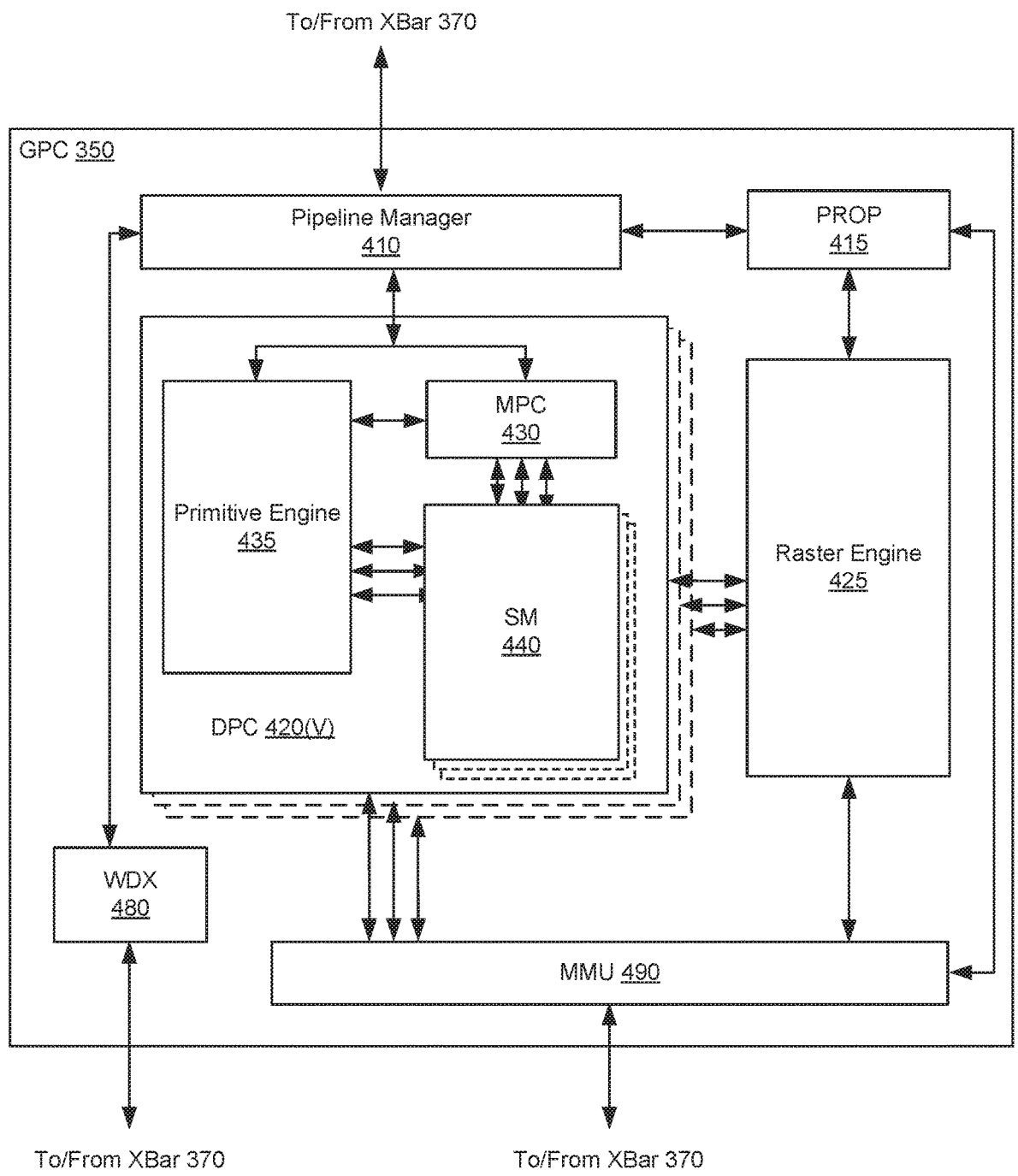
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
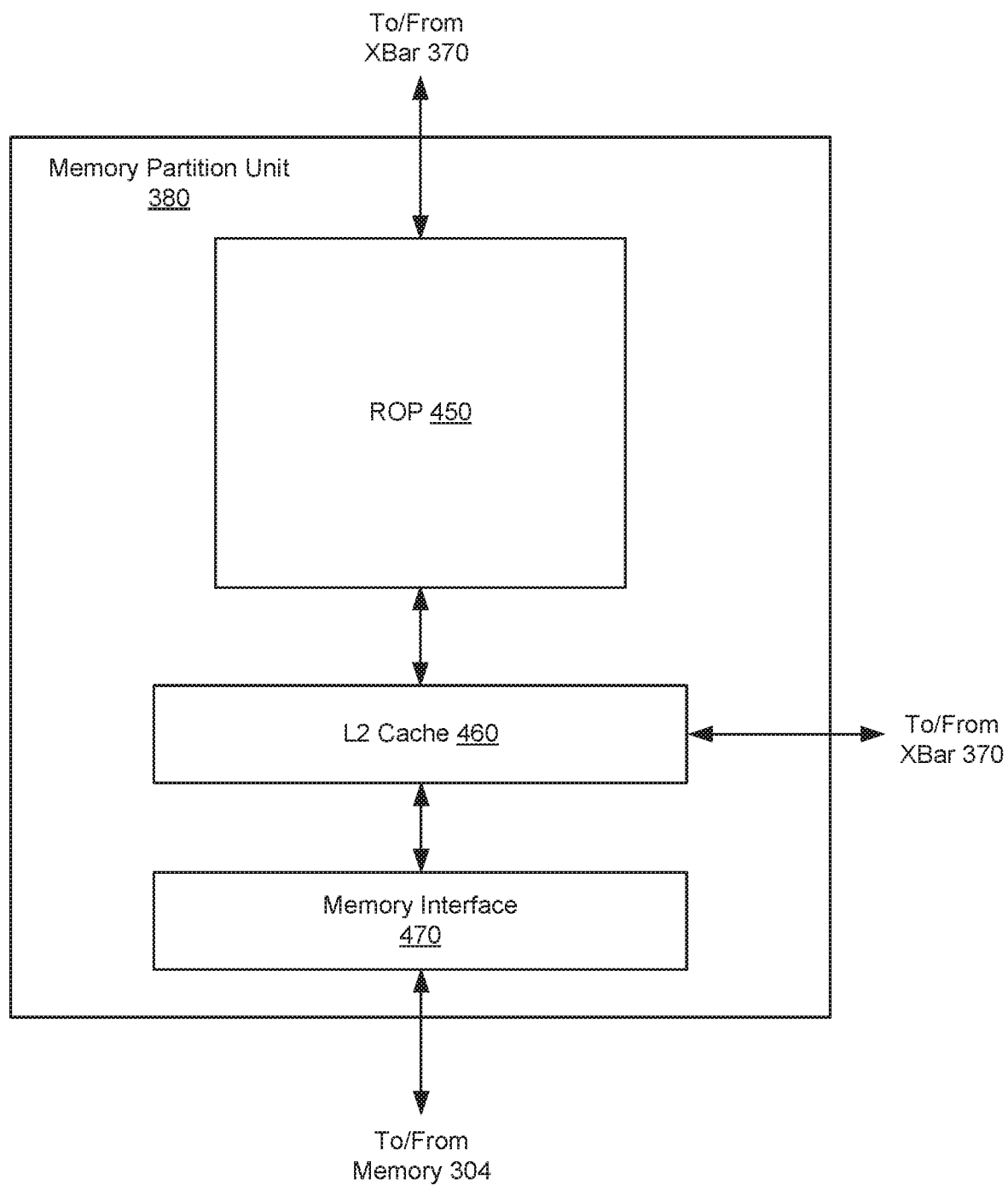
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
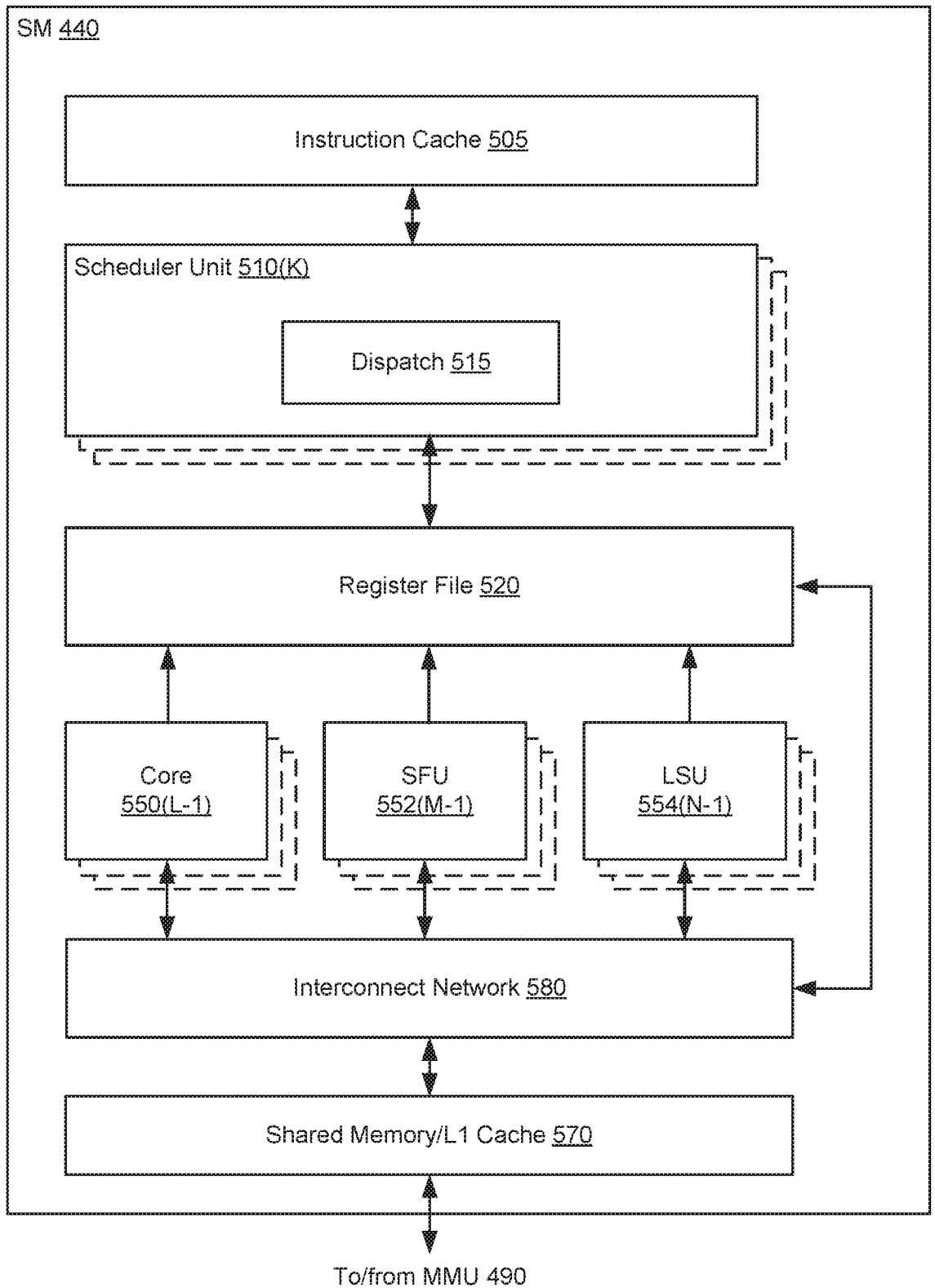
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 570. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
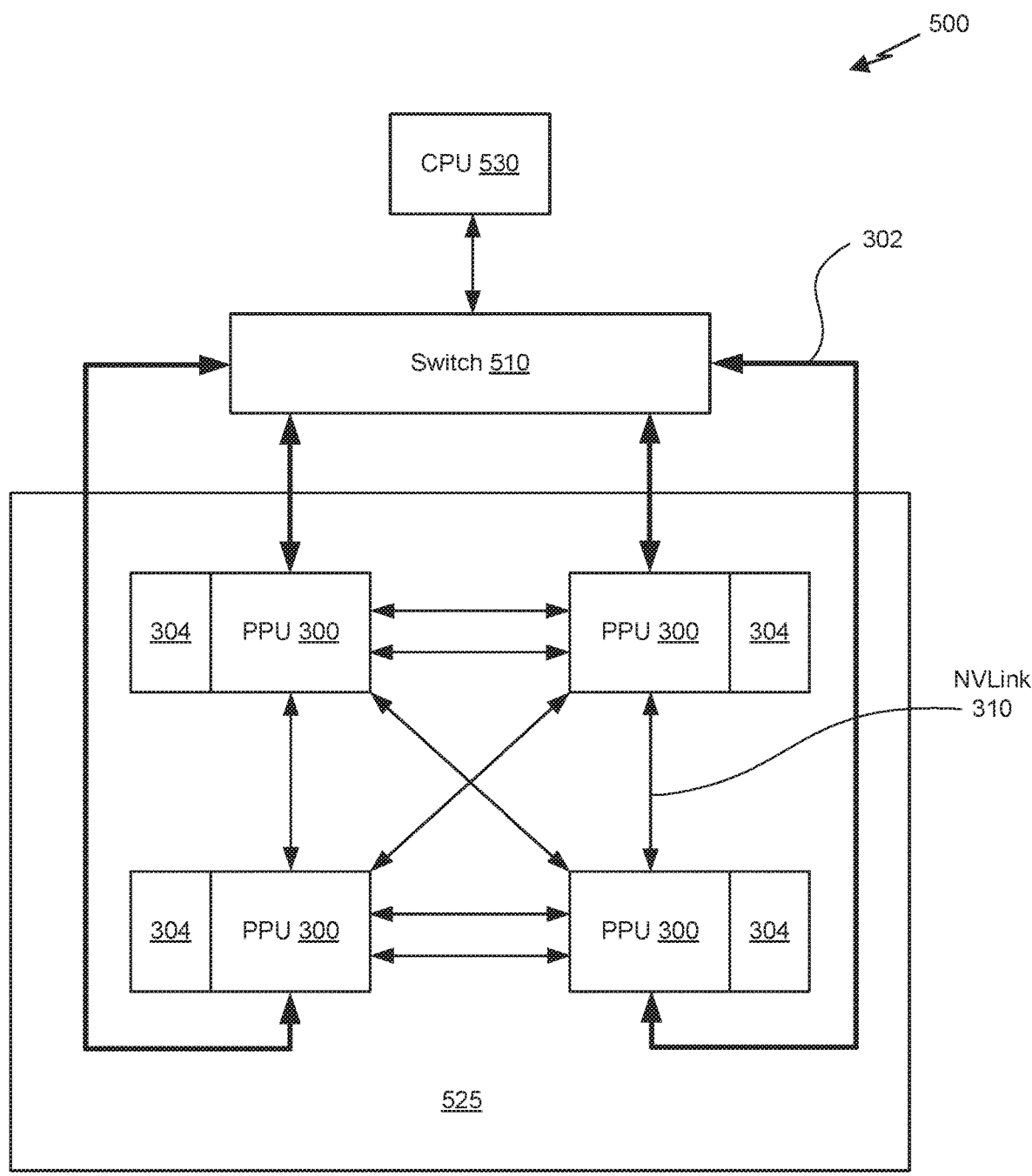
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabytes/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
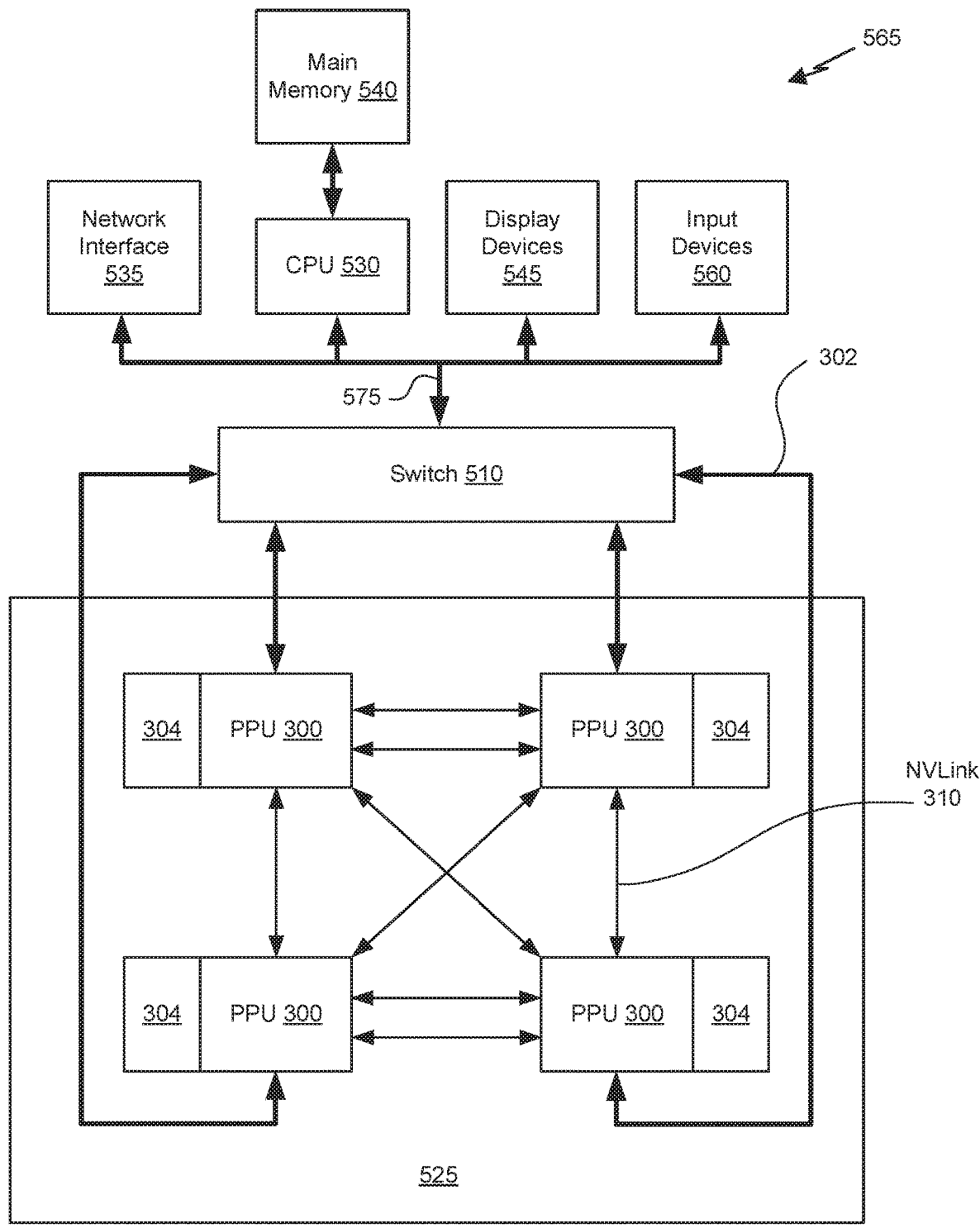
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g., a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
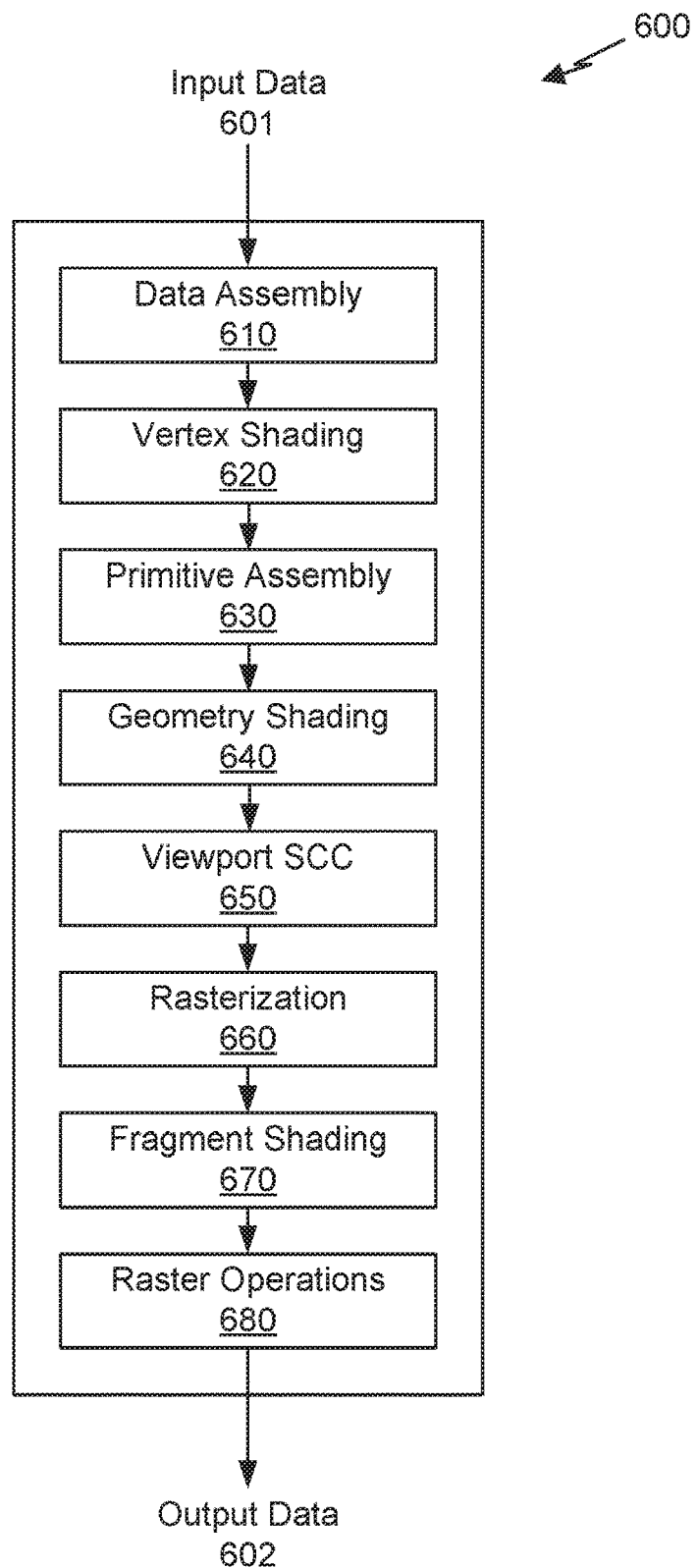
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Blind-Spot Network

Figure 7:
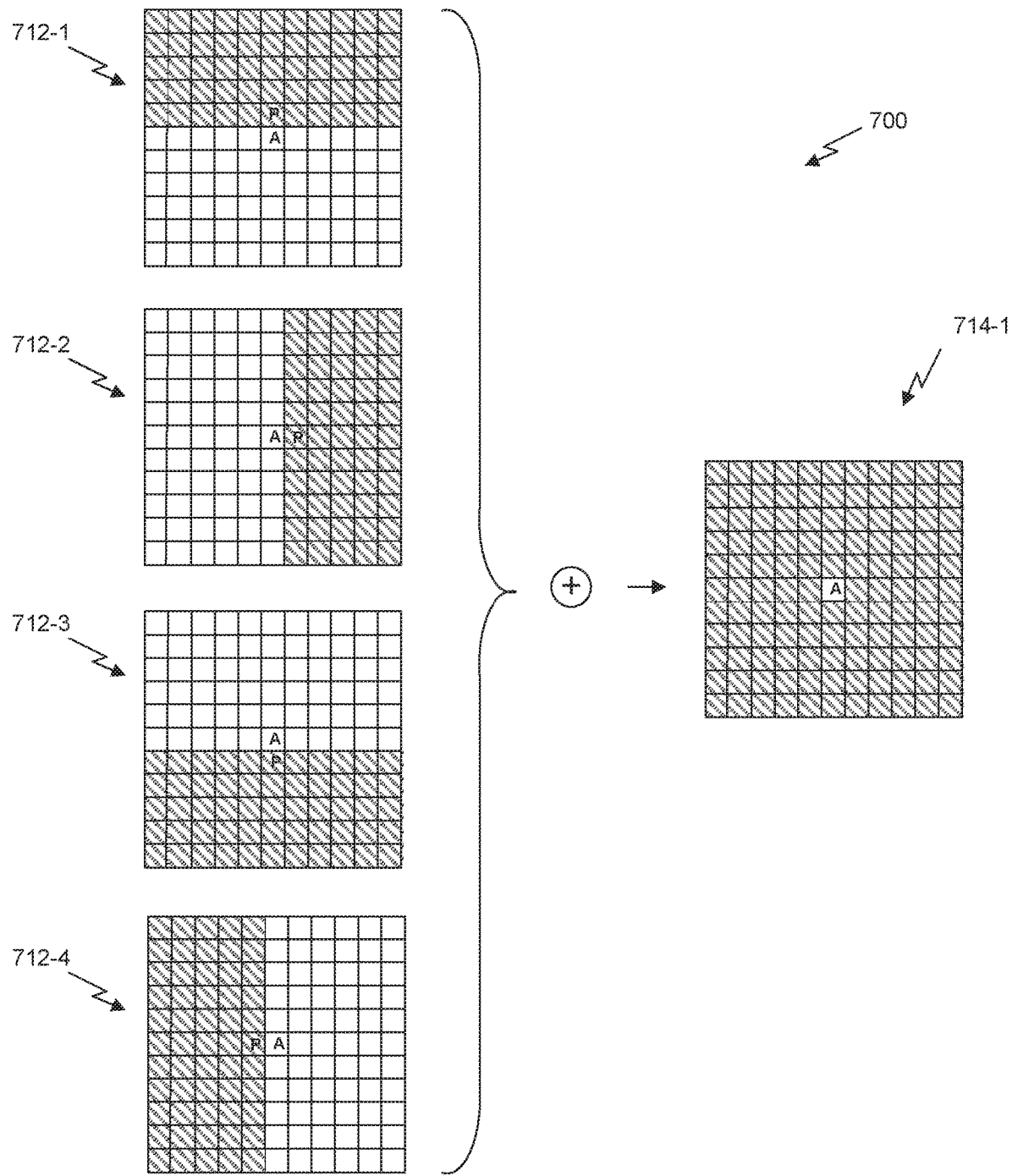
FIG. 7 is a conceptual illustration of a blind-spot network, in accordance with some embodiments.

FIG. 7 is a conceptual illustration of a blind-spot network 700, in accordance with some embodiments. The blind-spot network 700 can be implemented using the image processing system 200 of FIG. 2, with each network branch 212 configured to generate a component of an output pixel A based on a different receptive field.

As depicted in FIG. 7, a first network branch 212-1 can be configured to generate a component of an output pixel A using a receptive field 712-1 that extends upwards, away from pixel A and does not include pixel A. In an embodiment, the component of output pixel A is generated by applying a convolution kernel to pixel P, one pixel above output pixel A, where all of the non-zero values of the convolution kernel are above a horizontal line that passes through or borders on the central pixel of the convolution kernel.

A second network branch 212-2 can be configured to generate a second component of the output pixel A using a receptive field 712-2 that extends to the right, away from pixel A and does not include pixel A. In an embodiment, the component of output pixel A is generated by applying a rotated convolution kernel to pixel P, one pixel to the right of output pixel A, where all of the non-zero values of the convolution kernel are to the right of a vertical line that passes through or borders on the central pixel of the convolution kernel. It will be appreciated that the convolution kernel applied by the first network branch 212-1 can simply be rotated by 90 degrees to generate the convolution kernel applied by the second network branch 212-2.

A third network branch 212-3 can be configured to generate a third component of the output pixel A using a receptive field 712-3 that extends to downwards, away from pixel A and does not include pixel A. In an embodiment, the component of output pixel A is generated by applying a rotated convolution kernel to pixel P, one pixel below the output pixel A, where all of the non-zero values of the convolution kernel are below a horizontal line that passes through or borders on the central pixel of the convolution kernel.

A fourth network branch 212-4 can be configured to generate a fourth component of the output pixel A using a receptive field 712-4 that extends to the left, away from pixel A and does not include pixel A. In an embodiment, the component of output pixel A is generated by applying a rotated convolution kernel to pixel P, one pixel to the left of output pixel A, where all of the non-zero values of the convolution kernel are to the left of a vertical line that passes through or borders on the central pixel of the convolution kernel.

Each of the components of the output pixel A are then combined to produce the output pixel A, which has a receptive field 714-1 that extends out from pixel A in every direction, but does not include output pixel A. In effect, a neural network 210 has been configured to operate as a blind spot network. The four network branches 212 can generate values for each of the other pixels of the restored image 204 in much the same way as described above for output pixel A.

In an embodiment, it will be appreciated that each of the network branches 212 are configured to apply a rotated convolution kernel to the same input image. Nevertheless, it will be appreciated that the convolution kernel is offset from output pixel A in a particular direction. An easy way to implement the offset is to simply offset each version of the input image 202 supplied to a network branch 212 by one pixel in a particular direction. For example, a first version of the input image 202 provided to the first network branch 212-1 is shifted down one pixel, with the top row of the input image 202 padded by zeros; a second version of the input image 202 provided to the second network branch 212-2 is shifted left one pixel, with the right column of the input image 202 padded by zeros; a third version of the input image 202 provided to the third network branch 212-3 is shifted up one pixel, with the bottom row of the input image 202 padded by zeros; and a fourth version of the input image 202 provided to the fourth network branch 212-4 is shifted right one pixel, with the left column of the input image 202 padded by zeros. The rotated convolution kernels can then be applied to the same relative locations of the four shifted versions of the input image 202 to generate the components of the output pixel A with the receptive fields shown in FIG. 7.

In some embodiments, the shifting of each version of the input image 202 can be delayed until after the network branch 212 but before the composition layer 214. In other words, the output generated by each network branch 212 are shifted one pixel in a corresponding direction prior to being combined by the composition layer 214.

It will be appreciated that the non-zero weights of the convolution kernel do not need to be stored in a memory as they do not contribute to the output. In some embodiments, a smaller convolution kernel of, e.g., 3×5 pixels can be defined instead of a 5×5 convolution kernel where the bottom two rows of coefficients are zero-valued. In some embodiments, the convolution kernel can have any arbitrary size, e.g., 7 pixels by 11 pixels.

In other embodiments, the convolution operation can simply apply the rotated convolution kernels at a location offset from the output pixel A by a corresponding direction associated with each network branch 212. In yet another embodiment, a single convolution kernel is applied by each of the four network branches to four different rotated versions of the input image 202, each version of the input image 202 offset by one pixel in a particular direction. The outputs of each network branch 212 can then be rotated in the reverse direction before being composited to generate a composite output image.

It will be appreciated that the output of each network branch 212 can include n feature maps, where each pixel of the output corresponds to n distinct scalar values related, in some embodiments, to n different features of the input image 202. The network branch 212 can include multiple convolution layers where each convolution layer outputs multiple distinct feature maps (where multiple is not necessarily equal to n). Each output feature map of each convolution layer is associated with a distinct convolution kernel that may span multiple input feature maps of the layer.

In some embodiments, each instance of the network branch 212 is a U-Net with skip links. The number of levels of the encoder section and/or decoder section of the U-Net can vary. In one embodiment, a structure of the network branch 212 is given in Table 1. Each level of the encoder section includes at least one convolution layer followed by a max pooling layer using 2×2 stride to reduce a resolution, in pixel space, of the feature maps by half in each dimension of the pixel space. Each level of the decoder section includes an up-sampling layer and a concatenation layer to combine an up-sampled version of the output of the previous level of the decoder section with an output of a corresponding layer of the encoder section. It will be appreciated that all convolution operations are shown as having convolution kernels of size 3×3. However, other embodiments can implement different sized convolution kernels.

Table 1

| Name | Channels | Function |
| --- | --- | --- |
| Input | n | |
| Enc_Conv0 | 48 | Convolution 3 × 3 |
| Enc_Conv1 | 48 | Convolution 3 × 3 |
| Pool1 | 48 | Max Pool 2 × 2 |
| Enc_Conv2 | 48 | Convolution 3 × 3 |
| Pool2 | 48 | Max Pool 2 × 2 |
| Enc_Conv3 | 48 | Convolution 3 × 3 |
| Pool3 | 48 | Max Pool 2 × 2 |
| Enc_Conv4 | 48 | Convolution 3 × 3 |
| Pool4 | 48 | Max Pool 2 × 2 |
| Enc_Conv5 | 48 | Convolution 3 × 3 |
| Pool5 | 48 | Max Pool 2 × 2 |
| Enc_Conv6 | 48 | Convolution 3 × 3 |
| Upsample5 | 48 | Upsample 2 × 2 |
| Concat5 | 96 | Concatenate Pool4 |
| Dec_Conv5a | 96 | Convolution 3 × 3 |
| Dec_Conv5B | 96 | Convolution 3 × 3 |
| Upsample4 | 96 | Upsample 2 × 2 |
| Concat4 | 144 | Concatenate Pool3 |
| Dec_Conv4a | 96 | Convolution 3 × 3 |
| Dec_Conv4B | 96 | Convolution 3 × 3 |
| Upsample3 | 96 | Upsample 2 × 2 |
| Concat3 | 144 | Concatenate Pool2 |
| Dec_Conv3a | 96 | Convolution 3 × 3 |
| Dec_Conv3B | 96 | Convolution 3 × 3 |
| Upsample2 | 96 | Upsample 2 × 2 |
| Concat2 | 144 | Concatenate Pool1 |
| Dec_Conv2a | 96 | Convolution 3 × 3 |
| Dec_Conv2B | 96 | Convolution 3 × 3 |
| Upsample1 | 96 | Upsample 2 × 2 |
| Concat1 | 96 + n | Concatenate Input |
| Dec_Conv1a | 64 | Convolution 3 × 3 |
| Dec_Conv1B | 32 | Convolution 3 × 3 |
| Dec_Conv1C | m | Convolution 3 × 3 |

Figures 8A, 8B:
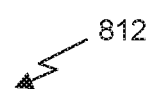
FIGS. 8A-8D illustrate an L-shaped kernel, in accordance with some embodiments.

FIGS. 8A-8D illustrate an L-shaped kernel 800, in accordance with some embodiments. It will be appreciated that a blind-spot network can be implemented with other types of kernels that result in receptive fields that never grow to include a particular pixel of the input image 202 within a corresponding pixel of the restored output image 204. One such example is an L-shaped kernel, as depicted in FIG. 8A. In this case, the center pixel in the convolution kernel 800 has a zero-value.

Figure 8C:
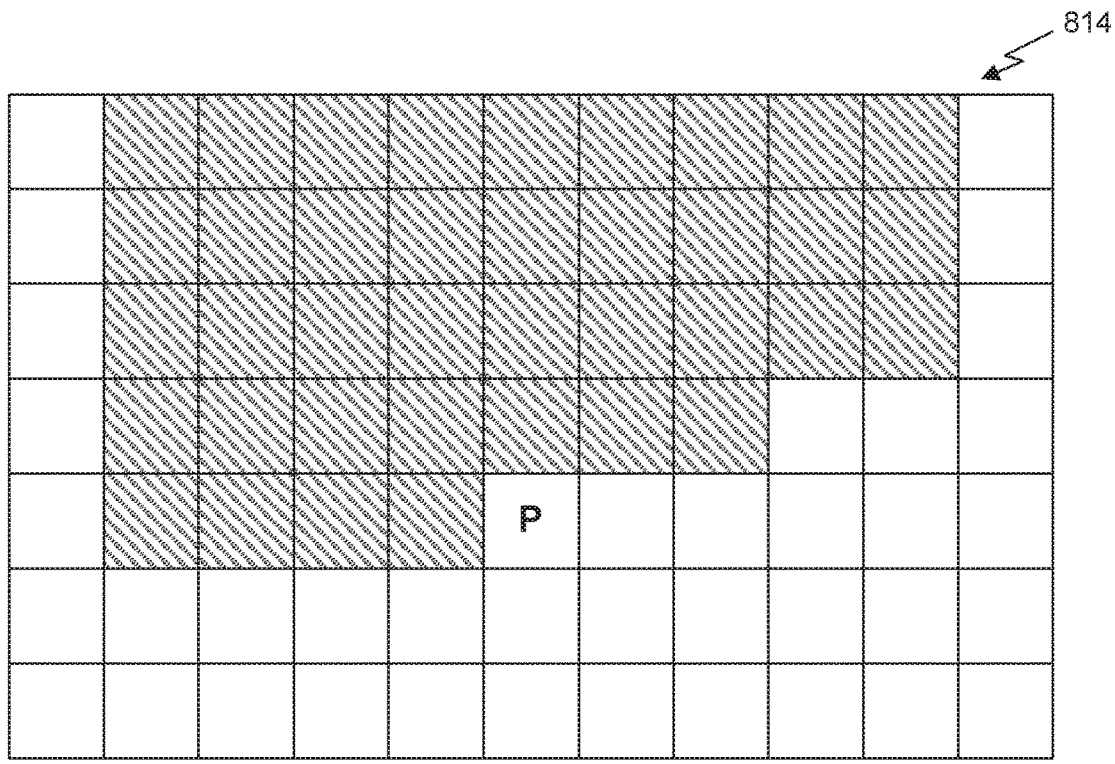
Figure 8D:
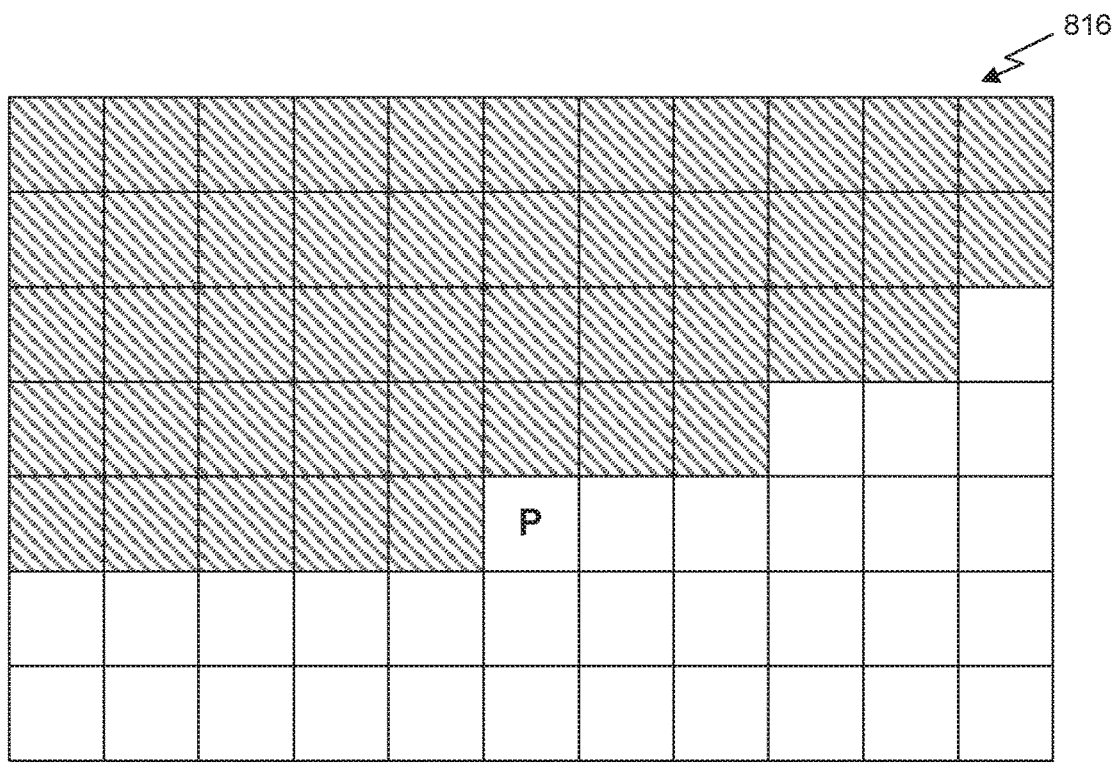

A receptive field 812 for the L-shaped kernel 800 after one convolution layer has been applied to the input image 202 is depicted in FIG. 8B. A receptive field 814 for the L-shaped kernel 800 after two convolution layers have been applied to the input image 202 is depicted in FIG. 8C. A receptive field 816 for the L-shaped kernel 800 after three convolution layers have been applied to the input image 202 is depicted in FIG. 8D.

It will be appreciated that, in some embodiments, the network branches 212 of image processing system 200 can be implemented to utilize L-shaped kernels, similar to L-shaped kernel 800. In such embodiments, there is no need to shift the input image 202 or the different versions of the output of each network branch 212 because the input pixel corresponding to an output pixel P is not included in the receptive field of the output pixel P, as is the case with the kernel 230. Consequently, four network branches 212 can utilize four rotated versions of an L-shaped kernel 800 (or four branches utilizing the same L-shaped kernel 800 on four rotated versions of the input image 202) to implement a blind-spot network for performing image de-noising.

Down-Sampling and Up-Sampling

It will be appreciated that convolution layers are not necessarily the only layers implemented by the network branches 212 of the image processing system 200. As listed in Table 1, the U-Net includes max pooling layers, up-sampling layers, and concatenation layers. Concatenation layers, similar to an activation function, do not spread information spatially and, therefore, can be implemented within the network branches 212 without modification. However, up-sampling layers or down-sampling layers (e.g., nearest neighbor interpolation, max pooling, etc.), change the spatial resolution of the feature maps and, therefore, the combination of a down-sampling layer followed by an up-sampling layer can spread information spatially. Consequently, these type of operations may need to be modified in a neural network implementation that is configured to restrict the receptive field of the output, such as a blind-spot network.

Figures 9A, 9B, 9C:
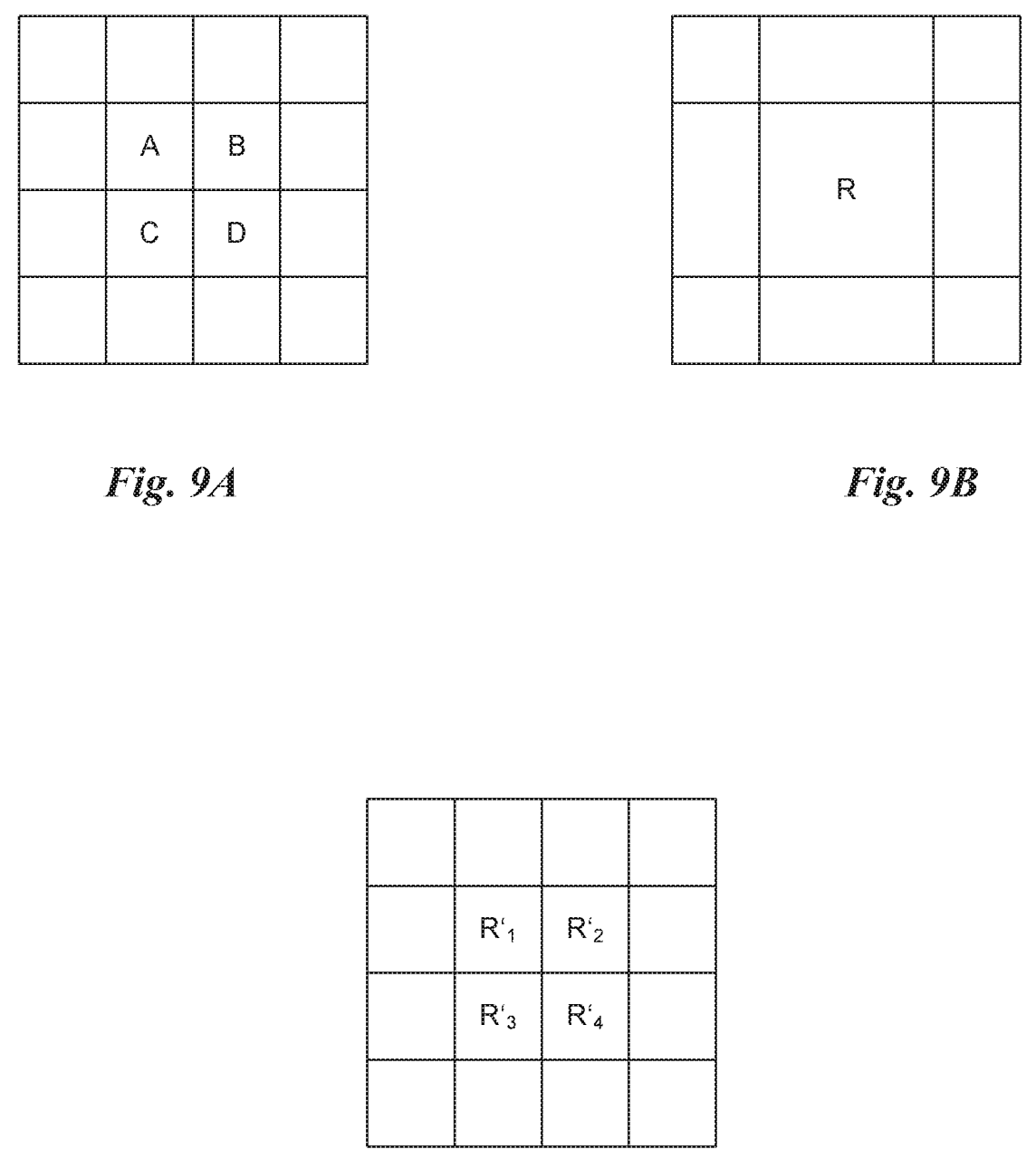

FIGS. 9A-9C are conceptual illustrations of the spread of information, spatially, due to down-sampling and up-sampling operations, in accordance with some embodiments. As depicted in FIG. 9A, a feature map includes four pixels having values A, B, C, and D in a 2 pixel by 2 pixel subset of the feature map. A down-sampling operation can be performed on the feature map, which reduces the spatial resolution of the feature maps by half in both dimensions of the pixel space. A filtered value R can be calculated for a pixel corresponding to the 2×2 pixel subset based on the values of A, B, C, and D, as depicted in FIG. 9B. A subsequent up-sampling operation can increase the spatial resolution of the feature maps, as shown in FIG. 9C. The up-sampled pixels can have values of $R'_1$, $R'_2$, $R'_3$, and $R'_4$.

Assuming the up-sampling operation is implemented as nearest neighbor interpolation, then $R'_1=R'_2=R'_3=R'_4=R$, which depends on the values of A, B, C, and D. It will be appreciated that the values of $R'_1$ and $R'_2$ depend on the values of C and D and the values of $R'_3$ and $R'_4$ depend on the values of A and B. Consequently, information is spread in multiple directions and the receptive field is not restricted to a particular half-plane relative to each of the pixels in the feature maps.

Figures 10A, 10B, 10C, 10D:
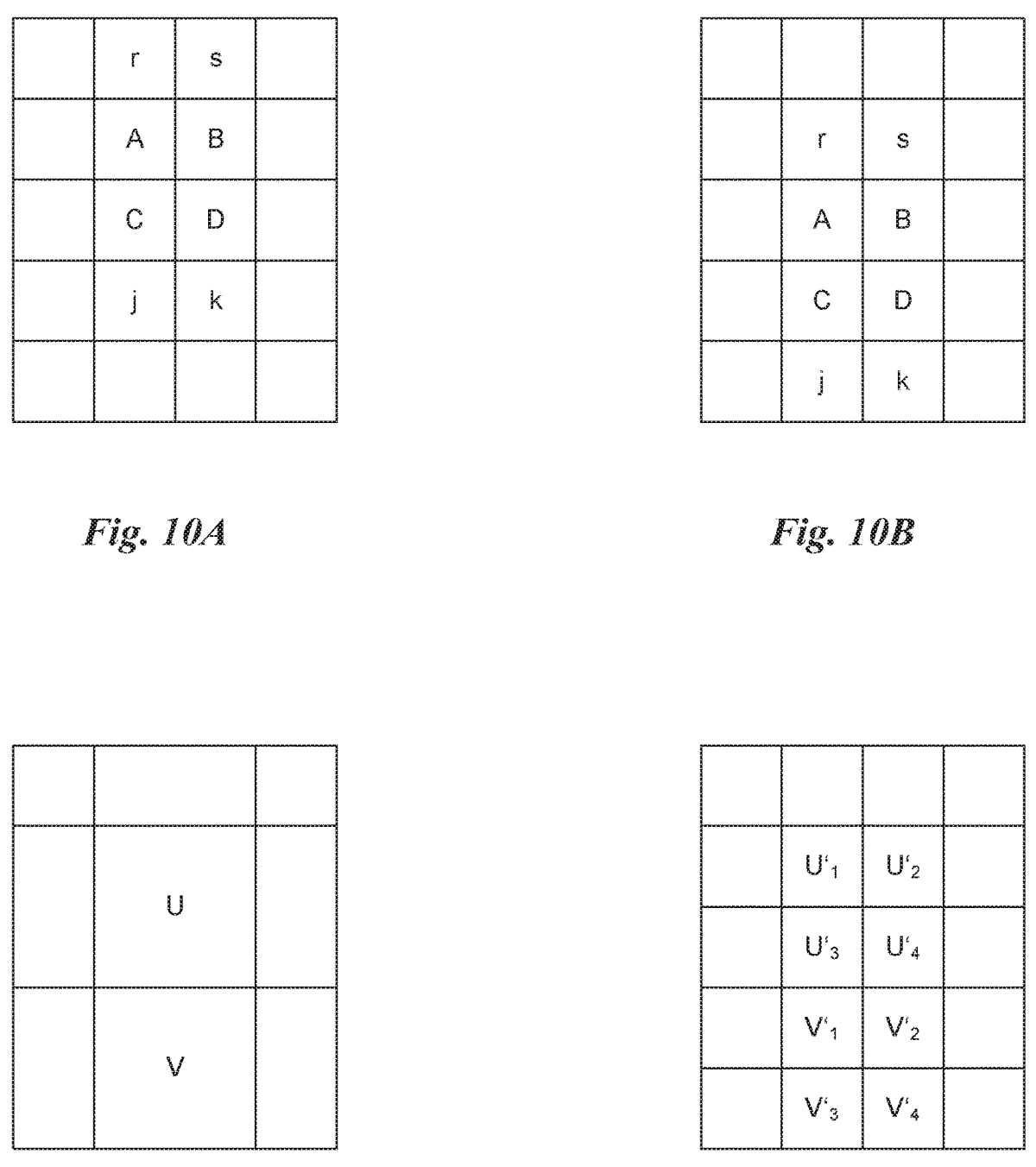

FIGS. 10A-10D illustrate modified up-sampling and down-sampling operations, in accordance with some embodiments. FIG. 10A depicts a feature map that includes four pixels having values A, B, C, and D in a 2 pixel by 2 pixel subset of the feature map. Prior to performing a down-sampling operation, the feature map is offset in one direction to prevent the spread of information in a particular direction. As depicted in FIG. 10B, the feature map of FIG. 10A is offset one row down (and the top row of the feature map is padded with zeroes). The same 2×2 pixel subset of the feature map now has values r, s, A, and B. A down-sampling operation, as depicted in FIG. 10C, reduces the resolution of the feature map, generating pixels having values U and V, respectively. A filtered value U can be calculated for a pixel corresponding to the 2×2 pixel subset based on the values of r, s, A, and B. A filtered value V can be calculated for a pixel corresponding to a 2×2 pixel subset based on the values of C, D, j, and k. After a subsequent up-sampling operation is performed, and the up-sampled pixels corresponding to the original pixels with values A, B, C, and D can have values of $U'_1$, $U'_2$, $U'_3$, and $U'_4$ and, as a consequence, the receptive field for these pixels is limited to expanding in a single half-plane relative to each of the pixels in the original feature maps because all four pixels are based at most on the values of A and B, not on the values of C or D.

It will be appreciated that the amount of the offset can be larger than one pixel, as long as the receptive field is always extending in one direction relative to a half-plane for the pixel. For example, the offset can be two pixels in the example given in FIG. 10, although the resulting operation would be such that the information in U was not based on the values of any of the corresponding pixels in the input feature maps. Consequently, offsets larger than the minimum required offset, although satisfying the condition of not extending the receptive field beyond a particular half-plane of any pixel, result in additional lost information that can make the result of the neural network less accurate.

Figures 11A, 11B, 11C, 11D:
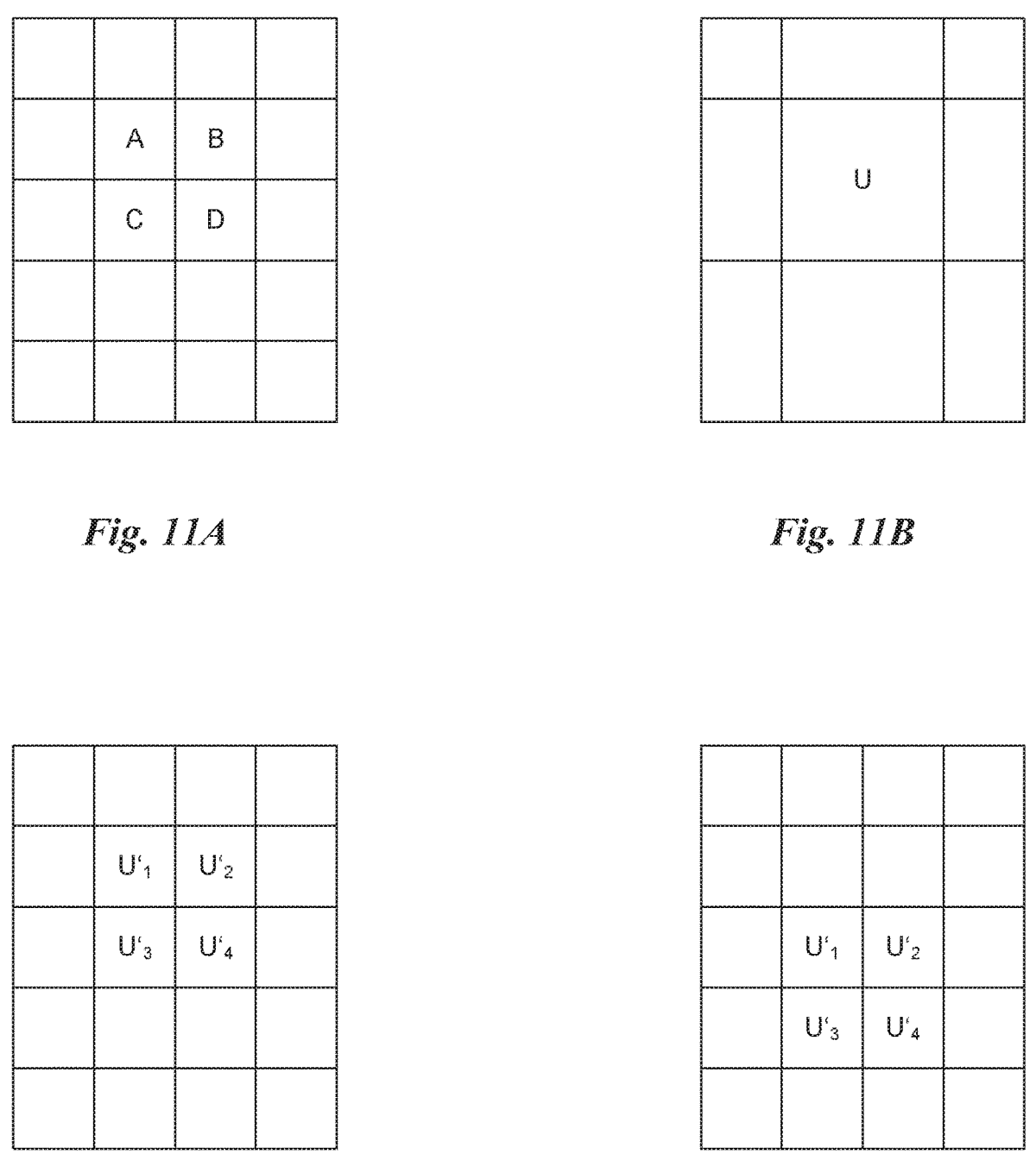

FIGS. 11A-11D illustrate modified up-sampling and down-sampling operations, in accordance with some embodiments. Rather than offsetting the values prior to the down-sampling operation, similar results can be achieved by performing the offset operation after the up-sampling operation. FIG. 11A depicts a feature map that includes four pixels having values A, B, C, and D in a 2 pixel by 2 pixel subset of the feature map. A down-sampling operation is performed, as depicted in FIG. 11B, that reduces the resolution of the feature map, generating pixels having a filtered value U, which can be calculated for a pixel corresponding to the 2×2 pixel subset based on the values of A, B, C, and D. An up-sampling operation is then performed, and the up-sampled pixels corresponding to the original pixels with values A, B, C, and D can have values of $U'_1$, $U'_2$, $U'_3$, and $U'_4$. After the up-sampling operation, the feature maps are offset down by one pixel such that the resulting receptive field for each of the pixels in the feature maps only extend in a particular half-plane relative to the pixel.

It will be appreciated that the examples shown in FIGS. 10A-11D only utilize a sampling factor of ½ or 2 in each dimension of the pixel space. However, in other embodiments, different sampling factors can be implemented by adjusting the amount of the offset. For example, a modified down-sampling operation utilizing a sampling factor of ¼ in each dimension of the pixel space (e.g., max pooling with a pooling window of 4×4 pixels) can be implemented by shifting the input feature map by at least 3 pixels in a particular direction corresponding to the desired half-plane direction. Similarly, a modified up-sampling operation utilizing a sampling factor of 4 in each dimension of the pixel space can be implemented by shifting the output feature map by at least 3 pixels in a particular direction corresponding to the desired half-plane direction.

It will also be appreciated that although the examples of FIGS. 10A-11D are shown utilizing an offset direction (e.g., down) for a particular network branch 212 associated with a half-plane extending upwards from the pixel, other instances of the network branch 212 can utilize a different offset direction (e.g., left, up, right) relative to a different half-plane orientation for that particular instance of the network branch 212.

Bayesian Inference

It will be appreciated that the image processing system 200 can be utilized to estimate the restored image 204 directly by outputting the values for one or more color components for each pixel estimated by the neural network 210. However, in some embodiments, a technique for improving the quality of the restoration operation can utilize Bayesian inference to predict output distributions for the clean color values rather than estimating the clean color values directly.

For example, the neural network 210 can be modified to output a composite feature volume that defines a parametric model for the distribution of each pixel value. In other words, the color values of the clean pixels are not predicted directly, but instead the likely color values are defined indirectly utilizing a probability distribution within the color space. In some embodiments, the parametric model is estimated as a univariate Gaussian distribution. $\mathcal{N}(\mu_x, \sigma_x)$ having a mean parameter and a standard deviation parameter for each of one or more color components. In an embodiment, the mean parameter is a three-element vector representing a mean color value in a three-component color space, and the standard deviation parameter is a three-element vector representing the square root of the variance associated with each component of the color space. In other embodiments, the mean parameter and standard deviation parameter can be single-element values corresponding to a monochromatic input image 202. In other embodiments, the parametric model is estimated as a multivariate Gaussian distribution $\mathcal{N}(\mu_x, \Sigma_x)$ having a mean parameter and a covariance matrix parameter.

A Bayesian de-noising algorithm can then be utilized by attempting to find the most likely clean value x for noisy value y, for each pixel, given the knowledge of the distribution of the value as represented by the distribution estimated by the neural network 210. In an embodiment, an observed marginal distribution of the noisy training data to the unobserved distribution of clean data is given as:

$$p(y|\Omega_y) = \int p(y|x) p(x|\Omega_y) dx, \quad (\text{Eq. 1})$$

where $\Omega_y$ represents the context surrounding noisy pixel y (i.e., the values of the noisy input pixels within a receptive field of noisy pixel y), $p(y|\Omega_y)$ is the distribution of the noisy training data conditioned on $\Omega_y$, $p(y|x)$ is the assumed distribution of the noise model (e.g., the distribution of noisy value y given a clean value of x), and $p(x|\Omega_y)$ is the distribution of the unobserved clean value x conditioned on $\Omega_y$. A neural network can be trained to predict the parametric model for the distribution $p(x|\Omega_y)$, which can, in an embodiment, be modeled as a multivariate Gaussian $\mathcal{N}(\mu_x, \Sigma_x)$. In another embodiment, the distribution can be modeled as a univariate Gaussian.

Bayes' theorem can then be used to estimate the posterior probability of the clean value x, given observations of both the noisy value y and the context $\Omega_y$, as follows:

$$p(x|y,\Omega_y) \propto p(y|x) p(x|\Omega_y), \quad (\text{Eq. 2})$$

where $p(x|\Omega_y)$ is the parametric distribution output by the network.

If the input image is corrupted with additive, zero-mean Gaussian noise, the corruption process can be modeled as:

$$\mu_y = \mu_x \text{ and } \Sigma_y = \Sigma_x + \sigma^2 I, \quad (\text{Eq. 3})$$

where σ is the standard deviation of the Gaussian noise. In some embodiments, the standard deviation of the Gaussian noise can be assumed to be known for each input image in the training data set. In other embodiments, the standard deviation of the Gaussian noise can be estimated by an auxiliary neural network. The architecture of the auxiliary neural network can be the same as the architecture for a network branch 212 except that the output of the auxiliary network is a single scalar value per pixel, and the standard deviation of the Gaussian noise is obtained by taking the mean value over the output of scalar values. In essence, the auxiliary neural network learns to estimate the standard deviation of the noise signal based on the noisy input image.

In some embodiments, the covariance matrix, $\Sigma_x$, can be parameterized as:

$$\Sigma_x = A_x^T A_x, \quad (\text{Eq. 4})$$

where $A_x$ is an upper triangular matrix, thus ensuring that $\Sigma_x$ is a valid covariance matrix. Consequently, the neural network only needs to predict the six non-zero values of $A_x$ to represent the covariance matrix $\Sigma_x$. The expected value of the resulting distribution associated with noisy pixel y and context $\Omega_y$ is then given as:

$$\mathbb{E}[p(x|y,\Omega_y)] = (\Sigma_x^{-1} + \sigma^{-2} I)^{-1} (\Sigma_x^{-1} \mu_x + \sigma^{-2} y) \quad (\text{Eq. 5})$$

The Equation above can be seen to mix the noisy pixel color y with the estimated mean $\mu_x$ based on a comparison of the uncertainty of the estimate, given by $\Sigma_x$, to the noise signal.

In an embodiment, the neural network is trained by minimizing the corresponding negative log-likelihood loss as given in Eq. 6:

$$\text{loss}(y,\mu_y,\Sigma_y) = \frac{1}{2}[(y-\mu_y)^T \Sigma_y^{-1} (y-\mu_y)] + \frac{1}{2} \log|\Sigma_y| + C \quad (\text{Eq. 6})$$

Figure 12:
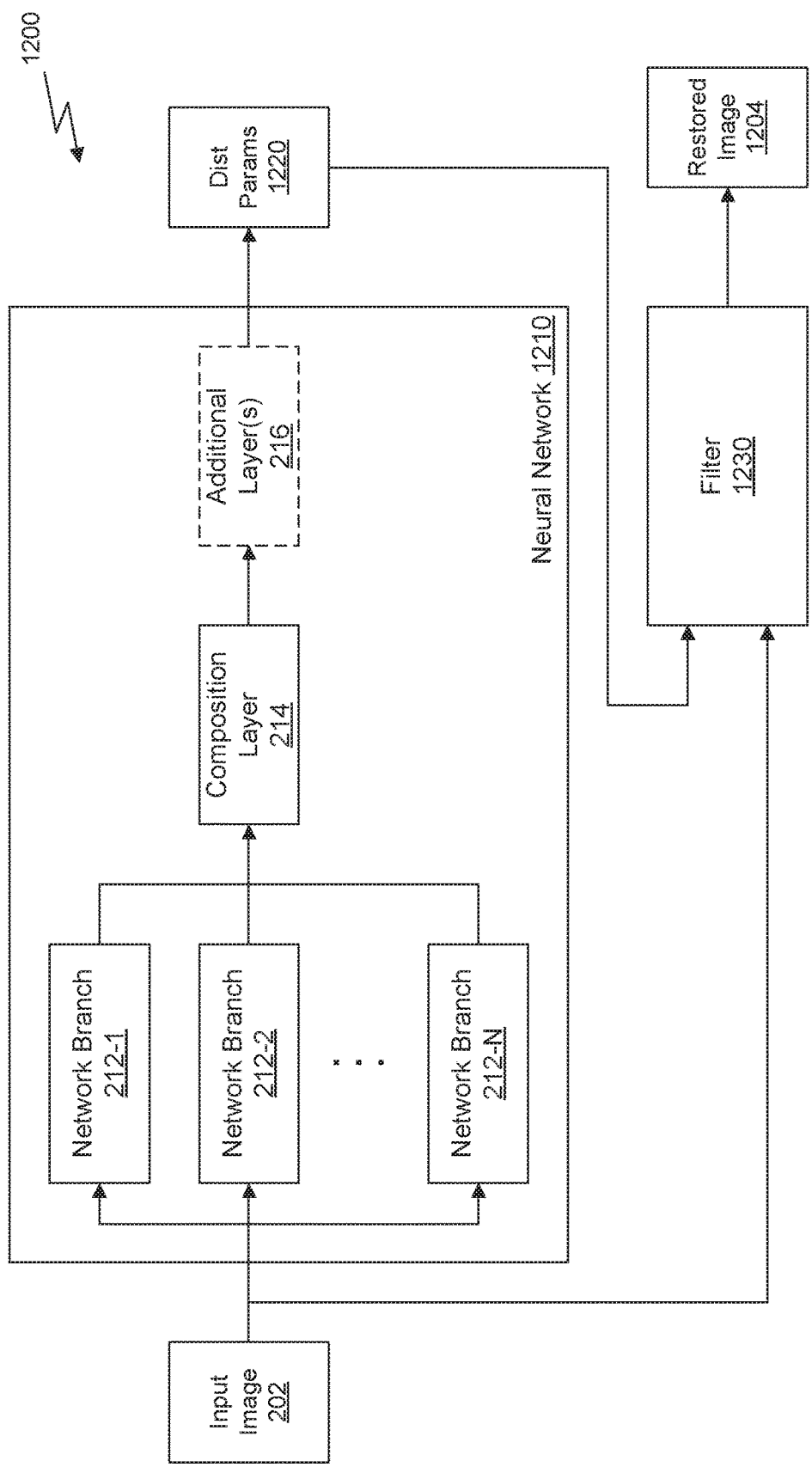
FIG. 12 illustrates an image processing system, in accordance with some embodiments.

FIG. 12 illustrates an image processing system 1200, in accordance with some embodiments. The neural network 1210 is similar to neural network 210, except the neural network 1210 is trained to generate distribution parameters 1220 for each of the output pixels of the restored image 1204 instead of predicting the restored image 1204 directly. The distribution parameters 1220 can be referred to as a composite feature volume. Again, in some embodiments, the distribution parameters 1220 can be trained to include a mean color value and the non-zero values of an upper triangular matrix corresponding to the covariance matrix for each of the predicted pixels of the restored image 1204. Yet again, in some embodiments, the distribution parameters 1220 can be trained to include a scalar mean value and a scalar variance value corresponding to a univariate Gaussian distribution for each predicted pixel.

Once the neural network 1210 has generated the distribution parameters 1220, the distribution parameters 1220 and the input image 202 are provided to a filter 1230 that is configured to generate the restored image 1204 based on the noisy values in the input image 202 and the predicted distribution parameters 1220, as set forth above in Equation 5.

Observations of the image processing system 1200 implementing a de-noising algorithm for a multi-component color image have shown that the choice of color space can affect the results. In tests, working in a YUV, or opponent, color space can yield better results than working in, e.g., an RGB color space.

In some embodiments, the technique implemented by the image processing system 1200 can be extended to other types of distributions than Gaussian distributions. For example, the Gaussian distribution model can be replaced with a Poisson distribution or an impulse distribution model, which can be a more accurate representation of noise for some signals.

Specifically, in some embodiments, the filter 1230 can be modeled based on the assumption that the input image is corrupted by Poisson noise. Poisson noise is an interesting practical application because Poisson noise may be better suited to model photon noise in image sensors. Compared to Gaussian noise, which is signal independent, Poisson noise is signal dependent as the noise level is dependent on a rate parameter, λ, which denotes a maximum event count. Poisson noise can be significant in photography where the scene irradiance is low or the aperture speed is fast, meaning fewer photons strike the image sensor such that the signal to noise ratio (SNR) for the image is reduced.

In an embodiment, the Poisson noise can be approximated as a signal-dependent Gaussian distribution where the standard deviation is given by $\sigma_i = \sqrt{x_i/\lambda}$, where i is the color channel, and the corruption model is given as:

$$\mu_y = \mu_x \text{ and } \Sigma_y = \Sigma_x + \lambda^{-1} \text{diag}(\mu_x) \quad (\text{Eq. 7})$$

The rate parameter λ can be approximated as a known parameter or as an unknown parameter estimated by the neural network 1200 or an auxiliary network. The filtering performed by filter 1230 can then be performed in accordance with Equation 5.

In another embodiment, the filter 1230 can be modeled based on the assumption that the input image is corrupted based on impulse noise. Each pixel in an image is, with a probability a, replaced by a uniformly sampled random color. The corruption process of the impulse noise is more complex than in previous cases because both the mean value and the covariance are modified, and there is a Dirac peak at the clean color value. To derive training loss, the probability distribution $p(x|\Omega_y)$ is approximated as a Gaussian, and the first and second moments of the distribution are matched to the data during training. The resulting mean and covariance are given by:

$$\mu_y = \frac{\alpha}{2}\begin{bmatrix}1\\1\\1\end{bmatrix} + (1-\alpha)\mu_x \quad \text{(Eq. 8)}$$

$$\sum_y = \frac{\alpha}{12}\begin{bmatrix}4&3&3\\3&4&3\\3&3&4\end{bmatrix} + (1-\alpha)\left(\sum_x + \mu_x\mu_x^T\right) - \mu_y\mu_y^T \quad \text{(Eq. 9)}$$

Equations 8 and 9 define the approximate probability distribution $p(y|\Omega_y)$ needed to train the neural network 1200. As with other types of noise, the parameter $\alpha$ is unknown and added as a learned parameter in the neural network 1200 or an auxiliary network. The posterior mean, i.e., the pixel value of the restored image 1204, is given by $$\mathbb{E}[p(x|y,\Omega_y)] = \frac{\alpha\mu_x + (1-\alpha)f\left(y;\mu_x\sum_x\right)y}{\alpha + (1-\alpha)f\left(y;\mu_x\sum_x\right)}, \quad \text{(Eq. 10)}$$

where $f$ denotes the probability density function of a Gaussian distribution.

Looking at Equation 10, the result is a linear interpolation between the mean $\mu_x$ predicted by the neural network 1200 and the potentially corrupted observed pixel value y. Informally, the less likely it is that the observed value y is found in the predicted distribution, the more likely the observed value represents noise and, therefore, the weight associated with the observed value is low compared to the weight of the predicted mean.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed. While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A computer-implemented method for restoring noisy data utilizing a blind-spot neural network, comprising:
   receiving noisy input data;
   processing the noisy input data by a plurality of network branches in the blind-spot neural network;
   compositing, within a composition layer of the blind-spot neural network, outputs from the plurality of network branches to generate a composite feature volume that comprises distribution parameters; and generating restored data based on the composite feature volume, wherein generating the restored data based on the composite feature volume comprises:

filtering the noisy input data based on the distribution parameters to generate the restored data, wherein the distribution parameters include, for each output value of the restored data, a mean parameter and a covariance parameter for a Gaussian distribution.

2. The method of claim 1, wherein processing the noisy input data by a plurality of network branches comprises:

processing versions of the noisy input data by the plurality of network branches.

3. The method of claim 1, wherein the composite feature volume comprises an estimate of clean values for the restored data.

4. The method of claim 1, wherein the Gaussian distribution comprises a multi-variate Gaussian distribution.

5. The method of claim 1, wherein the filtering of the noisy input data comprises receiving at least one parameter of a noise model that is estimated by an auxiliary neural network.

6. The method of claim 1, wherein each layer of one or more layers included in a network branch of the plurality of network branches implements a kernel characterized by a first portion of coefficients and a second portion of zero-valued coefficients that are separated by a line that passes through or borders on the center of the kernel.

7. The method of claim 1, wherein the blind-spot neural network is trained using a set of training data that includes a plurality of corrupted data without any realization of corresponding clean data.

8. A computer-implemented method for restoring noisy data utilizing a blind-spot neural network, comprising:

receiving noisy input data;

processing the versions of the noisy input data by a plurality of network branches in the blind-spot neural network;

compositing, within a composition layer of the blind-spot neural network, outputs from the plurality of network branches to generate a composite feature volume; and generating restored data based on the composite feature volume, wherein the noisy input data comprises a noisy input image, wherein each version of the noisy input image corresponds to a copy of the noisy input image offset in a direction associated with a corresponding network branch configured to process the version of the noisy input image, and wherein each network branch in the plurality of network branches implements one or more layers having a receptive field in a half-plane extending in a particular direction relative to an output pixel and having a particular orientation that is rotated relative to receptive fields of the other network branches in the plurality of network branches.

9. A computer-implemented method for restoring noisy data utilizing a blind-spot neural network, comprising:

receiving noisy input data;

processing the versions of the noisy input data by a plurality of network branches in the blind-spot neural network;

compositing, within a composition layer of the blind-spot neural network, outputs from the plurality of network branches to generate a composite feature volume; and generating restored data based on the composite feature volume, wherein the noisy input data comprises a noisy input image, wherein each version of the noisy input image corresponds to a copy of the noisy input image rotated to a particular orientation, and wherein each network branch in the plurality of network branches implements one or more layers having a receptive field in a half-plane extending in the same direction relative to an output pixel.

10. A system implementing a convolutional architecture for restoring noisy data, the system comprising:

a memory storing noisy input data; and at least one processor configured to process the noisy input data via a blind-spot neural network, wherein the blind-spot neural network includes:

a plurality of network branches configured to process versions of the noisy input data to generate features associated with a receptive field having a particular orientation; and a composition layer configured to composite outputs from the plurality of network branches to generate a composite feature volume that comprises distribution parameters, wherein the at least one processor is further configured to generate restored data based on the composite feature volume, wherein generating the restored data based on the composite feature volume comprises:

filtering the noisy input data based on the distribution parameters to generate the restored data, wherein the distribution parameters include, for each output value of the restored data, a mean parameter and a covariance parameter for a Gaussian distribution.

11. The system of claim 10, wherein the blind-spot neural network includes at least one additional layer configured to modify the composite feature volume, and wherein each layer of the at least one additional layer is restricted such that the receptive field for the layer does not spread information spatially within a spatial dimension of the composite feature volume.

12. A system implementing a convolutional architecture for restoring noisy data, the system comprising:

a memory storing noisy input data; and at least one processor configured to process the noisy input data via a blind-spot neural network, wherein the blind-spot neural network includes:

a plurality of network branches configured to process versions of the noisy input data to generate features associated with a receptive field having a particular orientation; and a composition layer configured to composite outputs from the plurality of network branches to generate a composite feature volume, wherein the at least one processor is further configured to generate restored data based on the composite feature volume, wherein the noisy input data comprises a noisy input image, wherein each version of the noisy input image corresponds to a copy of the noisy input image offset in a direction associated with a corresponding network branch configured to process the version of the noisy input image, and wherein each network branch in the plurality of network branches implements one or more layers having a receptive field in a half-plane extending in a particular direction relative to an output pixel and having a particular orientation that is rotated relative to receptive fields of the other network branches in the plurality of network branches.

13. The system of claim 12, wherein the one or more layers include at least one of a modified up-sampling layer or a modified down-sampling layer.

14. A system implementing a convolutional architecture for restoring noisy data, the system comprising:
 a memory storing noisy input data; and
 at least one processor configured to process the noisy input data via a blind-spot neural network, wherein the blind-spot neural network includes:
  a plurality of network branches configured to process versions of the noisy input data to generate features associated with a receptive field having a particular orientation; and
  a composition layer configured to composite outputs from the plurality of network branches to generate a composite feature volume,
 wherein the at least one processor is further configured to generate restored data based on the composite feature volume,
 wherein each version of the noisy input data corresponds to a copy of the noisy input data rotated to a particular orientation, and wherein each network branch in the plurality of network branches implements one or more layers having a receptive field in a half-plane extending in the same direction relative to an output value.

15. A non-transitory computer readable medium storing instructions that, when executed by at least one processor, cause the at least one processor to perform steps comprising:
 receiving noisy input data;
 processing the noisy input data by a plurality of network branches in the blind-spot neural network;
 compositing, within a composition layer of the blind-spot neural network, outputs from the plurality of network branches to generate a composite feature volume that comprises distribution parameters; and
 generating restored data based on the composite feature volume,
 wherein generating the restored data based on the composite feature volume comprises:
  filtering the noisy input data based on the distribution parameters to generate the restored data, wherein the distribution parameters include, for each output value of the restored data, a mean parameter and a covariance parameter for a Gaussian distribution.

16. The non-transitory computer readable medium of claim 15, wherein each layer of one or more layers included in a network branch of the plurality of network branches implements a kernel characterized by a first portion of coefficients and a second portion of zero-valued coefficients that are separated by a line that passes through or borders on the center of the kernel.

17. A non-transitory computer readable medium storing instructions that, when executed by at least one processor, cause the at least one processor to perform steps comprising:
 receiving noisy input data;
 processing the noisy input data by a plurality of network branches in the blind-spot neural network;
 compositing, within a composition layer of the blind-spot neural network, outputs from the plurality of network branches to generate a composite feature volume; and
 generating restored data based on the composite feature volume,
 wherein the noisy input data comprises a noisy input image,
 wherein processing the noisy input data by a plurality of network branches comprises processing versions of the noisy input image by the plurality of network branches,
 wherein each version of the noisy input image corresponds to a copy of the noisy input image offset in a direction associated with a corresponding network branch configured to process the version of the noisy input image, and
 wherein each network branch in the plurality of network branches implements one or more layers having a receptive field in a half-plane extending in a particular direction relative to an output pixel and having a particular orientation that is rotated relative to receptive fields of the other network branches in the plurality of network branches.

\* \* \* \* \*